United States Patent
Carames et al.

(10) Patent No.: US 11,409,644 B2
(45) Date of Patent: Aug. 9, 2022

(54) VALIDATION OF MOBILE DEVICE WORKFLOWS

(71) Applicant: MicroStrategy Incorporated, Vienna, VA (US)

(72) Inventors: Herminio Carames, Lansdowne, VA (US); Andrew Smith, Oakton, VA (US); Binbin Wu, Broadlands, VA (US); Ying Ma, Falls Church, VA (US); Jun Peng, Great Falls, VA (US); David Hagen, Herndon, VA (US)

(73) Assignee: MicroStrategy Incorporated, Vienna, VA (US)

( * ) Notice: Subject to any disclaimer, the term of this patent is extended or adjusted under 35 U.S.C. 154(b) by 13 days.

(21) Appl. No.: 16/815,788

(22) Filed: Mar. 11, 2020

(65) Prior Publication Data

US 2020/0293436 A1 Sep. 17, 2020

Related U.S. Application Data

(60) Provisional application No. 62/816,301, filed on Mar. 11, 2019.

(51) Int. Cl.
*G06F 9/44* (2018.01)
*G06F 11/36* (2006.01)
*G06F 8/61* (2018.01)

(52) U.S. Cl.
CPC .......... *G06F 11/3688* (2013.01); *G06F 8/61* (2013.01); *G06F 11/3692* (2013.01)

(58) Field of Classification Search
CPC ..... G06F 11/3688; G06F 11/3692; G06F 8/61
See application file for complete search history.

(56) References Cited

U.S. PATENT DOCUMENTS

| | | | |
|---|---|---|---|
| 6,816,871 | B2 | 11/2004 | Lee |
| 6,964,051 | B1 | 11/2005 | Palaniappan |
| 7,552,438 | B1 | 6/2009 | Werme et al. |
| 7,581,011 | B2 | 8/2009 | Teng |
| 7,802,174 | B2 | 9/2010 | Teng et al. |
| 7,937,655 | B2 | 5/2011 | Teng et al. |

(Continued)

OTHER PUBLICATIONS

U.S. Office Action in U.S. Appl. No. 16/557,482, dated Nov. 30, 2020, 13 pages.

(Continued)

*Primary Examiner* — Chat C Do
*Assistant Examiner* — Lenin Paulino
(74) *Attorney, Agent, or Firm* — Fish & Richardson P.C.

(57) ABSTRACT

Methods, systems, and apparatus, including computer programs encoded on a computer-readable storage media, for validation of mobile device workflows. In some implementations, a mobile device application to be tested is identified. An installation of the application on each of a plurality of remote mobile devices, including mobile devices having different hardware configurations and different operating system configurations, is initiated. Usage of the application by instructing the remote mobile devices to perform a series of operations using the application is simulated. Performance of the respective mobile devices during the simulated usage is measured. A document indicating performance of the application across the different mobile device configurations is generated.

17 Claims, 5 Drawing Sheets

(56) References Cited

U.S. PATENT DOCUMENTS

| | | |
|---|---|---|
| 9,166,895 B1 | 10/2015 | Sivaraman |
| 9,311,161 B2 | 4/2016 | Jagtap |
| 9,436,535 B2 | 9/2016 | Rickert et al. |
| 9,762,450 B2 | 9/2017 | Xie |
| 9,811,849 B2 | 11/2017 | Bursey |
| 10,803,411 B1 | 10/2020 | Smith et al. |
| 10,810,041 B1 | 10/2020 | Myers et al. |
| 10,997,135 B2 | 5/2021 | Zoll et al. |
| 11,025,707 B1 | 6/2021 | Luker |
| 11,102,330 B2 | 8/2021 | Gardner et al. |
| 11,263,111 B2 | 3/2022 | Lang et al. |
| 2003/0135382 A1 | 7/2003 | Marejka et al. |
| 2004/0060044 A1 | 3/2004 | Das et al. |
| 2004/0068424 A1 | 4/2004 | Lee et al. |
| 2007/0038931 A1 | 2/2007 | Allaire et al. |
| 2008/0115195 A1 | 5/2008 | Malek et al. |
| 2009/0063699 A1 | 3/2009 | Chapweske et al. |
| 2010/0162406 A1 | 6/2010 | Benameur et al. |
| 2010/0250487 A1 | 9/2010 | Gabriel et al. |
| 2010/0318986 A1 | 12/2010 | Burke et al. |
| 2011/0055823 A1 | 3/2011 | Nichols et al. |
| 2012/0054095 A1 | 3/2012 | Lesandro et al. |
| 2012/0198279 A1* | 8/2012 | Schroeder ........... G06F 11/2294 714/32 |
| 2012/0290950 A1 | 11/2012 | Rapaport et al. |
| 2014/0331209 A1* | 11/2014 | Singh ................. G06F 11/3688 717/127 |
| 2015/0081574 A1 | 3/2015 | Selby et al. |
| 2015/0089479 A1 | 3/2015 | Chen et al. |
| 2015/0100829 A1 | 4/2015 | Nanjundappa et al. |
| 2015/0178052 A1 | 6/2015 | Gupta et al. |
| 2015/0220426 A1 | 8/2015 | Spektor et al. |
| 2015/0242636 A1* | 8/2015 | Khan .................... G06F 21/577 726/25 |
| 2015/0287101 A1 | 10/2015 | Baldwin et al. |
| 2016/0026555 A1* | 1/2016 | Kuo .................... G06F 11/3612 717/131 |
| 2016/0294614 A1 | 10/2016 | Searle et al. |
| 2016/0371170 A1 | 12/2016 | Salunke et al. |
| 2017/0034023 A1 | 2/2017 | Nickolov et al. |
| 2017/0161105 A1 | 6/2017 | Barrett et al. |
| 2017/0315981 A1 | 11/2017 | Shrestha et al. |
| 2017/0372442 A1 | 12/2017 | Mejias |
| 2018/0075202 A1 | 3/2018 | Davis et al. |
| 2018/0083995 A1 | 3/2018 | Sheth et al. |
| 2018/0114126 A1 | 4/2018 | Das et al. |
| 2018/0267908 A1 | 9/2018 | Pan et al. |
| 2018/0287902 A1 | 10/2018 | Chitalia et al. |
| 2018/0330293 A1 | 11/2018 | Kulkarni et al. |
| 2019/0042900 A1 | 2/2019 | Smith et al. |
| 2019/0109822 A1 | 4/2019 | Clark et al. |
| 2019/0213068 A1 | 7/2019 | Upadhyay |
| 2019/0317829 A1 | 10/2019 | Brown et al. |
| 2020/0019393 A1* | 1/2020 | Vichare ..................... G06F 8/60 |
| 2020/0119979 A1 | 4/2020 | Woodland et al. |
| 2020/0204465 A1 | 6/2020 | Baker et al. |
| 2020/0257612 A1 | 8/2020 | Lang et al. |
| 2020/0366572 A1 | 11/2020 | Chauhan |
| 2021/0064492 A1 | 3/2021 | Myers |
| 2021/0065078 A1 | 3/2021 | Gardner et al. |
| 2021/0067607 A1 | 3/2021 | Gardner et al. |
| 2021/0073026 A1 | 3/2021 | Myers et al. |
| 2021/0081298 A1 | 3/2021 | Gardner et al. |
| 2021/0124610 A1 | 4/2021 | Gardner et al. |

OTHER PUBLICATIONS

U.S. Office Action in U.S. Appl. No. 16/787,596 dated Nov. 25, 2020, 11 pages.

Ancillaryinsights[online], "MicroStrategy Analytics Enterprise—Upgrade Guide", 2013, retrieved on Sep. 29, 2021, 122 pages.

Bedford-computing [online], "JMeter Tutorial", retrieved on Sep. 29, 2021, 53 pages.

HP [online], "An Introduction to HP LoadRunner software" May 2011, retrieved on Sep. 29, 2021, 8 pages.

Jaspersoft [online], "Performance Testing with Jmeter," 2012, retrieved on Sep. 29, 2021, retrieved from URL, 4 pages.

Microfocus [online], "LoadRunner and Performance Center," Feb. 2018, retrieved on Sep. 29, 2021, 249 pages.

MicroStrategy [online], "KB 16749: What is MicroStrategy Integrity Manager?", 2019, retrieved on Sep. 29, 2021, 2 pages.

MicroStrategy [online], "Configuring an upgrade test environment," 2019, retrieved on Sep. 29, 2021, 2 pages.

MicroStrategy [online], "High-level steps to configure an upgrade test environment," 2019, retrieved on Sep. 29, 2021, 2 pages.

MicroStrategy [online], "Integrity Manager—Upgrade Impact Testing," 2019, retrieved on Sep. 29, 2021, 2 pages.

MicroStrategy [online], "Integrity Manager Homepage," 2019, retrieved on Sep. 29, 2021, 2 pages.

MicroStrategy [online], "MicroStrategy Capacity Testing Tool," 2019, retrieved on Sep. 29, 2021, 2 pages.

MicroStrategy [online], "MicroStrategy Integrity Manager" 2017, retrieved on Sep. 29, 2021, 2 pages.

MicroStrategy [online], "MicroStrategy Upgrade Best Practices" Aug. 2019, retrieved on Sep. 29, 2021, 2 pages.

MicroStrategy [online], "Perform Basic Stability Testing," 2019, retrieved on Sep. 29, 2021.

MicroStrategy [online], "The Upgrade Process Checklist," 2019, retrieved on Sep. 29, 2021, 3 pages.

MicroStrategy [online], "Upgrade Analysis Dossier," 2020, retrieved on Sep. 29, 2021, 2 pages.

MicroStrategy [online], "Upgrade Guide—Upgrading your MicroStrategy Enterprise Software," Jun. 2016, retrieved on Oct. 8, 2021, 109 pages.

Tutorialspoint [online], "JMETER—Quick Guide," 2007, retrieved on Sep. 29, 2021, 49 pages.

U.S. Office Action in U.S. Appl. No. 17/005,640, dated Dec. 22, 2021, 26 pages.

U.S. Office Action in U.S. Appl. No. 17/024,050, dated Aug. 19, 2021, 13 pages.

Office Action in U.S. Appl. No. 16/787,596, dated Nov. 1, 2021, 10 pages.

Office Action in U.S. Appl. No. 17/013,005, dated Nov. 24, 2021, 18 pages.

Office Action in U.S. Appl. No. 17/024,050, dated Feb. 1, 2022, 6 pages.

\* cited by examiner

VALIDATION OF MOBILE DEVICE WORKFLOWS

CROSS-REFERENCE TO RELATED APPLICATION

This application claims priority to and the benefit of U.S. Provisional Application No. 62/816,301, filed on Mar. 11, 2019, which is incorporated herein by reference in its entirety.

FIELD

This disclosure generally relates to workflows involving computing operations.

BACKGROUND

Different mobile devices operate in different ways, and so software that runs well on one type of device may not work well on other types of devices. Testing of software on different devices may be needed to ensure compatibility.

SUMMARY

In some implementations, a system can validate mobile device workflows for a variety of mobile devices. The system interacts with a set of remote mobile devices over a network to execute automated workflows on the remote mobile devices and measure the results. In some implementations, the remote mobile devices are part of a mobile device farm or device bank that is made available by a third party and allows configuration and allocation of devices through an application programming interface (API). The system can automatically or semi-automatically select workflows to test on the remote devices, often based on data indicating actual operations that users have previously performed.

As part of the testing, the system automatically installs an application on the remote mobile devices. This allows the system to test the installation and update processes for the application, as well as test the functionality and performance of the installed application. The system also creates one or more server environments that are accessible by the mobile devices during workflow testing. These server environments can each be a dynamically allocated, cloud-computing-based virtual machine. The server environment(s) and the remote mobile devices used can be separate from systems that support actual users, so that the computational load on the server environment(s) and mobile devices does not affect end users. When the application has been installed on the mobile devices, the system performs the selected workflows by simulating actions that a user would perform while using the application. These workflows can include sequences of user operations including simulated user inputs to the application. The system can measure and analyze the performance of both the mobile devices executing the workflows and the server environment supporting the mobile devices. Over the course of testing, the configurations of the mobile devices and the server environment may be varied to operate each of the mobile devices in a plurality of different configurations.

In some implementations, a user can initiate the testing of one or more workflows on a remote device. The user can choose the one or more remote devices for the workflows to be performed on, and/or the types of devices for the workflows to be performed on.

In some implementations, the user can choose configuration parameters for the one or more remote devices, for the application, and for a server environment used in the testing. In some implementations, the system varies the configuration parameters of the one or more remote devices, of the application, and/or of the server environment.

In some implementations, the system chooses the workflows to be tested based on prior usage of the application. In other implementations, the user chooses the workflows to be tested. In yet other implementations, workflows are chosen based on a combination of prior usage and user input.

In some implementations, the test results include performance results. These performance results may test a variety of factors such as latency, task completion time, throughput, CPU utilization, memory utilization, network bandwidth utilization, and so on. The performance results can be used to develop device and/or server environment profiles which can, in turn, be used to optimize an application for each particular device or server environment, or combination of the two.

In some implementations, the system may discover trends between devices or aspects of one or more devices, such as, for example, which devices performed similarly. Based on these trends, the system may determine a representative configuration (e.g., from among various device types and different combinations of device settings) that can be used in subsequent testing so that the performance of other configurations can be estimated without needing to test the other configurations.

In one aspect, a method includes: identifying a mobile device application to be tested; initiating installation of the application on each of a plurality of remote mobile devices, including mobile devices having different configurations; simulating usage of the application by instructing the remote mobile devices to perform a series of operations using the application; measuring performance of the respective mobile devices during the simulated usage; and generating a document indicating performance of the application across the different mobile device configurations.

In some implementations, the method includes receiving data indicating a command to install an application on a group of remote mobile devices having different hardware configurations and different operating system configurations.

In some implementations, the method includes retrieving prior usage data of the application to be installed and an application installer for the application to be installed.

In some implementations, the method includes testing installation of the application on each of the plurality of remote mobile devices by logging errors and measuring performance of installation processes executing on each of the remote mobile devices.

In some implementations, the plurality of remote mobile devices includes mobile phones from different manufacturers and running different operating system versions.

In some implementations, initiating installation includes remotely initiating installation of the mobile device application on each of a plurality of remote mobile devices of different configurations that are operated by and made accessible by a third-party provider over a communication network.

In some implementations, the method includes: accessing usage data indicating previous usage of the mobile device application by multiple users; and defining a workflow that includes a sequence of operations of the mobile device application, the sequence of operations being determined based on sequences of user inputs indicated by the usage data. Where simulating usage of the application includes providing input to the application running on the remote mobile devices that simulates user input causing the application to perform the sequence of operations for the workflow.

In some implementations, simulating usage of the application includes causing the application to perform operations using documents and data sets served by a server system over a network. In these implementations, the method includes: configuring a particular cloud-based virtual server environment to serve the documents and data sets used in the simulated usage of the application; and configuring the application installations on the remote mobile devices to communicate with the particular cloud-based virtual server environment.

In some implementations, measuring performance of the respective mobile devices during the simulated usage includes validating results generated by the respective mobile devices with respect to a set of reference results.

In some implementations, measuring performance of the respective mobile devices during the simulated usage includes measuring at least one of response time, error occurrence, task completion time, accuracy of results, or system stability.

In some implementations, the method includes varying operating parameters of the application on the mobile devices or a server environment in communication with the mobile devices to operate each of the mobile devices in a plurality of different configurations. Where simulating usage of the application includes, for each of the mobile devices, simulating usage of the application installed on the mobile device with the application operating in the different configurations that use different operating parameters of the application or the server environment; and where measuring performance of the respective mobile devices includes, for each of the mobile devices, measuring performance of the mobile device to determine performance measures for each of the different configurations that use different operating parameters of the application or the server environment.

In some implementations, varying the operating parameters includes varying operating parameters of the mobile devices including at least one of a size of a data cache on the mobile device, a working data amount for tasks of the application, an amount of memory allocated to the application or a portion of the application, a level of concurrency of tasks, a computational load of tasks performed, or a level of network bandwidth required for tasks.

In some implementations, varying the operating parameters includes varying operating parameters of the server environment including at least one of a size of a cache for the server environment, a working data amount for tasks performed, an amount of memory allocated, an amount of processors allocated, or a software version used in the server environment.

In some implementations, the method includes determining, based on the performance measures for each of the different configurations, different limits on operating parameters of the application on the different mobile devices needed to achieve one or more performance criteria; and determining, for each of multiple mobile device types, a device profile that specifies one or more limits for the operating parameters of the application for operating on mobile device of the mobile device type.

In some implementations, the method includes: determining, based on the measured performance, groups of mobile device types that have similar performance; selecting a subset of mobile device types from each group of device types; performing additional testing on devices of device types in the selected subsets of mobile device types; and characterizing performance of the mobile device types that are not in the selected subsets based on the additional testing of the devices of device types in the selected subsets.

In some implementations, the method includes determining, based on the measured performance, relative performance measures indicating relationships between performance characteristics of devices of different configurations; and determining performance estimates for devices of configurations that are not tested based on the relative performance measures.

Other embodiments of this and other aspects described herein include corresponding systems, apparatus, and computer programs (e.g., encoded on computer storage devices), where the systems, apparatus, and computer programs are configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

In another aspect, a system includes: a client device configured to receive input from a user; a first server includes a data storage, the first server configured to: store application data; communicate with the client device; produce one or more workflows based on the stored application data; receive performance measurements; and generate a document indicating performance of an application across the group of remote mobile devices; a second server configured to communicate with the first server; the group of remote mobile devices configured to communicate with the second server; and a virtual server environment configured to communicate with the group of mobile devices.

In some implementations, the input from the user includes: a selection of an application; and a selection of the group of remote mobile devices, where the group of remote mobile devices includes mobile devices having different hardware configurations and different operating system configurations.

In some implementations, the application data includes: prior usage data indicating previous usage of the application; and an application installer for the application. Where the one or more workflows includes a sequence of operations of the application, the sequence of operations being determined based on the prior usage data.

In some implementations, the second server is further configured to provide the first server access to the group of mobile devices over a communication network.

In some implementations, the virtual server environment is further configured to serve one or more documents and data sets to the group of mobile devices.

In another aspect, a method includes: receiving data indicating a command to install an application on a group of remote mobile devices having different hardware configurations and different operating system configurations; retrieving prior usage data of the application to be installed and an application installer for the application to be installed; installing the application on the group of remote mobile devices; simulating usage of the application by instructing the remote mobile devices to perform a series of operations using the application; measuring performance of the respective remote mobile devices during the simulated usage; and generating a document indicating performance of the application across the different mobile devices.

In another aspect, one or more non-transitory computer-readable media storing a computer program, the program includes instructions that when executed by one or more processing devices cause the one or more processing devices to perform operations including: receiving, by the one or more processing devices, data indicating a command to install an application on a group of remote mobile devices having different hardware configurations and different operating system configurations; retrieving, by the one or more processing devices, prior usage data of the application to be installed and an application installer for the application to be installed; installing, by the one or more processing devices, the application on the group of remote mobile devices; simulating usage of the application by instructing the remote mobile devices to perform a series of operations using the application; measuring performance of the respective remote mobile devices during the simulated usage; and generating a document indicating performance of the application across the different mobile devices.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
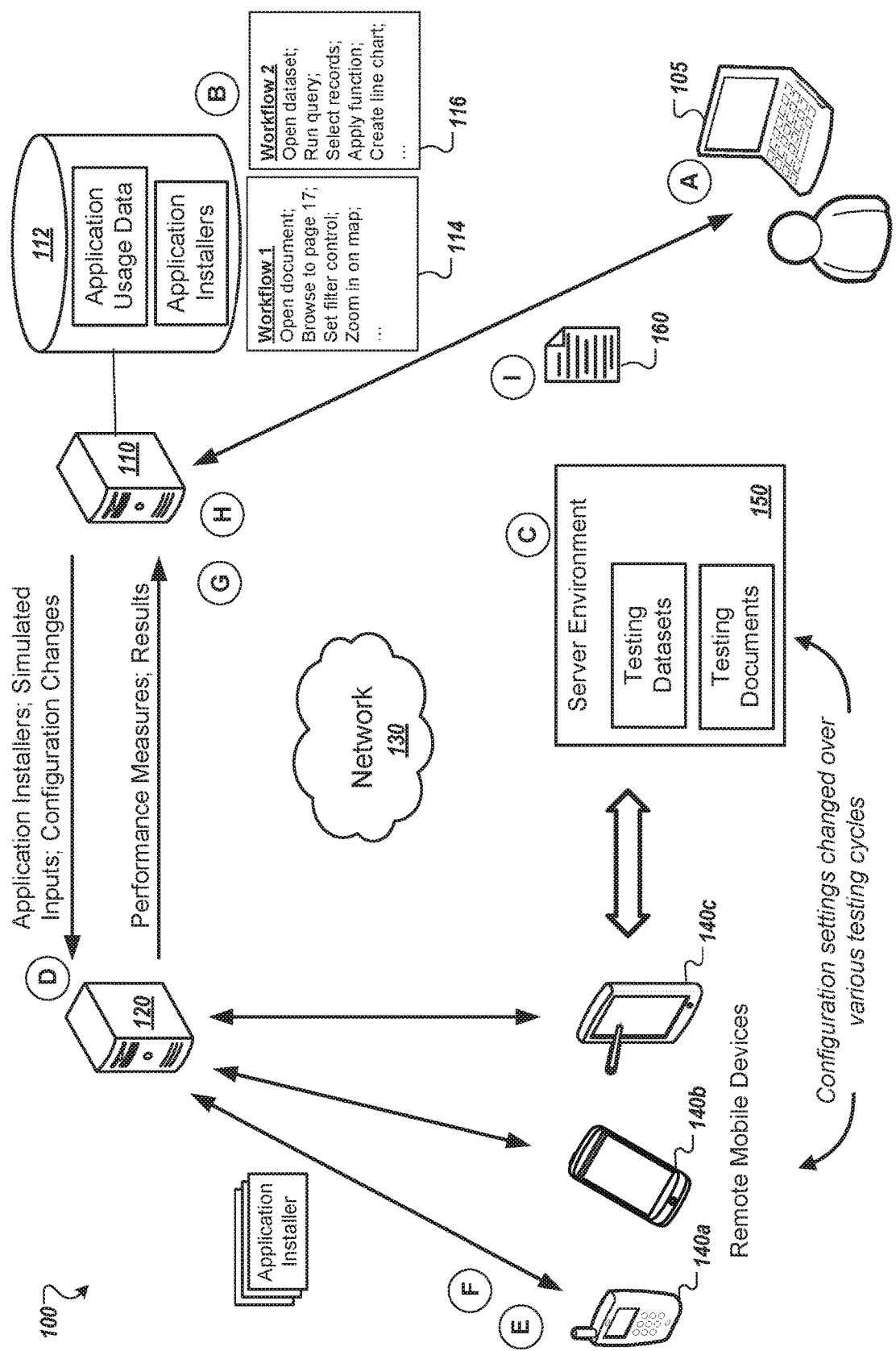
FIG. 1 is a diagram that illustrates an example system for creating, testing, and validating mobile device workflows.

FIG. 1 is a diagram that illustrates an example system 100 for creating, testing, and validating mobile device workflows in order to tailor an application to specific devices and servers, and combinations thereof. The system 100 includes a client device 105, remote mobile devices 140a-140c, a first server 110, a second server 120, and a server environment 150 created by the first server 110.

The system 100 provides a user with access to a variety of remote devices on which an application or a version of an application can be installed so that a workflow may be performed (e.g., by simulating the inputs normally entered by a device user). This system allows for the creation of a server environment to be used for the workflow testing, and for the configuration of application, device, and/or server environment parameters before and/or during testing. The results of the testing can later be used to tailor the application to the specific devices and servers, and combinations thereof.

FIG. 1 also illustrates a flow of events, shown as stages (A) to (I), with each representing a step in an example process. Stages (A) to (I) may occur in the illustrated sequence, or in a sequence that is different from the illustrated sequence. For example, some of the stages may occur concurrently.

The remote mobile devices 140a-140c can be portable computing devices, e.g., mobile phones, smart phones, personal digital assistants (PDA), music players, e-book readers, tablet computers, wearable computing devices (e.g., smart watches), laptop computers, or other portable computing devices. Mobile devices 140a-140c are typically physically remote from the first server 110, and are also often provided by a third party as part of a mobile device farm or bank and are made accessible through an application programming interface (API). The mobile devices 140a-140c are typically dedicated to access through the API for operations such as application testing, and are generally not devices owned or used by end users.

Mobile devices 140a-140c interact with the server environment 150 over network 130. Mobile devices 140a-140c may have the same manufacturer or differing manufactures. Mobile devices 140a-140c may have the same hardware configuration, similar hardware configurations (e.g., devices share some components but not others, or some devices have slightly older or slightly newer versions of the same component, etc.), or differing hardware configurations. As shown, mobile devices 140a-140c are each a different type of device (e.g., 140a is a mobile phone, 140b is a smart phone, and 140c is a tablet computer). However, mobile devices 140a-140c may each be a different model of the same type of device (e.g., they are all smart phones, with each being a different model from one or more manufactures). Mobile devices 140a-140c may each be the same type of device but are running different operating systems (e.g., Android, iOS, etc.) or different versions of an operating system (e.g., Android Donut, Android Cupcake, Android Eclair, etc.). Mobile devices 140a-140c may each be the same model of the same device type but are running different operating systems or different versions of an operating system. Mobile devices 140a-140c may each be the same model of the same device type and are each running the same operating system and same version of the operating system. Although only three mobile devices (mobile devices 140a-140c) are shown, system 100 may use more or less mobile devices during the validation process.

Client device 105 may can be a computing device, such as, for example, a desktop computer or laptop computer. The client device 105 communicates with a first server 110 over a network 130

The first server 110 has a data storage 112 containing application usage data and application installers. First server 110 can include one or more computers. The first server 110 communicates with a second server 120 over network 130. In some implementations, one or more computers of the server 110 may communicate with the client device 105 and one or more other computers may perform other tasks, such as communicating with the second server 120.

The second server 120 can include one or more computers. The second server 120 communicates with mobile devices 140a-140c over network 130. In some implementations, one or more computers of the server 120 may communicate with the first server 110 and one or more other computers may perform other tasks, such as communicating with the mobile devices 140a-140c. Second server 120 may be provided by a third-party. Second server 120 may be part of a cloud computing platform (e.g., Amazon Web Services (AWS), Microsoft Azure, and so on).

The network 130 can include public and/or private networks and can include the Internet.

The server environment 150 stores or accesses testing datasets and testing documents. The server environment 150 is created and configured for the testing of mobile devices 140a-140c by the first server 110. Server environment 150 can be a virtual, cloud-based environment. A virtual environment is also known as a guest, an instance, a container, or an emulation. Server environment 150 may be created through a virtual machine model, paravirtual machine model, or through OS-level virtualization. Server environment 150 may be managed/hosted by second server 120 or by another third-party.

In general, a workflow refers to a series of operations (e.g., inputs, actions, or tasks) that can be performed on a corresponding application installed on a device. Typically, these operations are initiated or requested by a user of the device on which the corresponding application is installed. However, the disclosed system simulates a user initiating these operations.

The techniques disclosed in this document can reduce the time and cost of workflow creation, and increase the effectiveness of workflow testing by creating workflows based on prior usage data of the corresponding application. The prior usage data may indicate operations that are always performed, operations that are frequently performed, operations that are sometimes performed, operations that are rarely performed, and operations that are never performed. The proposed system can automatically collect and organize prior usage data, thus reducing the need for user input and associated costs. The proposed system can use the prior usage data to form workflows with or without the input of a user, thus reducing the time and cost of workflow creation. In addition, testing time and costs can be reduced by creating workflows based on operations that are always performed, frequently performed, and/or sometimes performed while limiting the testing of operations that are never and/or are rarely performed. Using prior usage data in this way may also increase the performance and reliability of the resulting, customized application by ensuring that it works for operations that are most frequently performed by users or are otherwise likely to arise.

The techniques disclosed in this document can reduce costs, increase reliability, and provide a more pleasant user experience by customizing an application for a particular device or server, or combination of the two, based on the results of the validation process. As will be discussed in more detail below, through the validation process, the disclosed system will test the limits of the device and/or server in terms of concurrency, data size, processing demands, communication bandwidth, etc. From the performance results, the system will create a device and/or server profile for a corresponding application that will indicate the minimum/maximum criteria (e.g., minimum cache size, minimum RAM allocated, maximum active records) for a device and/or server to achieve satisfactory performance. Based on these profiles, the corresponding application can be tailored with customized parameters for the particular device and/or server. This will result in a better user experience by ensuring that the application will perform adequately across devices and will be less likely to crash. These profiles may also help to reduce application costs (e.g., server costs) by indicting, for example, that more server performance is being allocated than is needed for the application to adequately run on a particular device.

The techniques disclosed in this document can also reduce costs of testing and validating workflows on real environments (e.g., actual devices) by determining performance trends across devices having various software and/or hardware configurations in order to select a representative device(s) from devices performing similarly. In doing this, further testing and validation of subsequent workflows or application builds can be done on the representative device without the need to test all devices that had performed similarly. The results of the testing and validation of subsequent workflows or application builds can be used to not only adjust the parameters of the application for the representative device but for all devices that had initially performed similarly to the device.

As shown in FIG. 1, in stage (A), the process of testing application software starts with a user (e.g., a software developer or an administrator) accessing a user interface using the client device 105. Through the client device 105, the user can set the scope and type of testing to be performed. The scope and type of testing can include an identification of the application to be tested, an identification of particular version(s) of the application to be tested (e.g., different build versions of the application, whether for development or release), a selection of mobile devices to be tested (e.g., mobile devices 140a-140c), the mobile device parameters to be tested, and the server parameters to be tested (e.g., parameters for server environment 150). The user interface shown on the client device 105 may be provided by a web page, a web application, a native application, or other software. The client device 105 communicates the scope and type of testing to be performed to the first server 110.

A selection of mobile devices can include the selection of a manufacturer, a selection of a model, a selection of a hardware configuration (e.g., specified amount of random access memory, specified processor, etc.), a selection of an operating system (e.g., iOS, Android, Windows, etc.), and/or a selection of a version of an operating system (e.g., Android Donut, Android Cupcake, Android Eclair, etc.). The mobile device parameters can include data cache size, working data amount for operations of the selected application, an amount of memory allocated to the selected application or a portion of the selected application (e.g., an amount of random-access memory), an amount of CPU allocation (e.g., a number of cores of a CPU) for the selected application or portion of the selected application, a level of concurrency of the operations, a computational load of operations performed, and/or operating system settings on the mobile device. A set of parameters defines a configuration to be tested.

The user of the client device 105 can choose a single device configuration, multiple device configurations, or a set of device configurations having a range of one or more parameters (e.g., testing random-access memory allocation at different increments from 16 MB up to 100 MB) to be tested. In some implementations, the user of the client device 105 does not set the range of the one or more parameters and the system 100 will test various configurations by varying the parameters of the mobile device, potentially until an error, failure, or performance limit occurs.

The server parameters can include the network bandwidth, the latency, the cache size, the number of CPUs allocated, the working data amount for operations performed, an amount of memory (e.g., random-access memory), and/or a software version used in the server environment 150. A set of parameters defines a configuration to be tested. Like the device configurations above, the user of the client device 105 can choose a single server configuration, multiple server configurations, or a set of server configurations having a range of one or more parameters. Where multiple sets of parameters or set containing a range of parameters is to be used, multiple variations of server environment 150 will be created and tested.

In some implementations, the user of the client device 105 does not set the range of the one or more parameters. In this case, the system 100 will test various configurations by varying the parameters for the server, potentially until an error, failure, or performance limit occurs.

In some implementations, the user also selects one or more workflows to be performed or individual operations that are to be included in a workflow to be performed.

In stage (B), the first server 110 accesses data storage 112 containing application usage data and application installers (e.g., software programs that can install the application on the respective mobile devices 140a-140c). Based on the application selected and the build version(s) of the application to be tested, as outlined in the received scope and type of testing to be performed, the server 110 obtains application usage data and application installers for the build version(s) of the selected application. The server 110 determines patterns of prior user inputs and actions (e.g., operations) using the selected application. Prior user inputs and actions can include, for example, a command to open a document, a command to close a document, a search command, an input to turn on one or more filters, an input to turn off one or more filters, an input to zoom in on a map, an input to zoom out of a map, a scroll input, a swipe input, etc. These prior user inputs and actions can be part of the usage data stored on the data storage 112.

The application usage data can include or include an indication of the application operations that are always performed by the application users or a group of application users (e.g., performed by 100% of the application users, and/or have a 100% chance of being performed by one or more of the application users within a given time period or session), the application operations that are frequently performed by the multiple users (e.g., performed by 75% or more of the application users, and/or only have a 75% chance or greater of being performed by one or more of the application users within a given time period or session), the application operations that are sometimes performed by the multiple users (e.g., performed by 25%-75% of the application users, and/or only have a 25%-75% chance of being performed by one or more of the application users within a given time period or session), the application operations that are rarely performed by the multiple users (e.g., performed by only 25% or less of the application users, and/or only have a 25% chance or less of being performed by one or more of the application users within a given time period or session), and/or the application operations that are never performed by the multiple users (e.g., performed by 0% of the application users, and/or have a 0% chance of being performed by one or more of the application users within a given time period or session). The application usage data can include data collected over a given time period. For example, the application usage data can include data collected over the last week, the last month, the last year, or the like. The application usage data can include data collected on a single version of the application, such as the last released version of the application. Alternatively, the application usage data can include data collected on multiple versions of the application, such as the two or three most recent application versions. The application usage data can also indicate the order or sequences in which each of the multiple users performed the operations on the application.

In some implementations, the application usage data includes or includes indications of prior inputs and actions made by multiple users when using the application. Prior user inputs and actions can include, for example, a command to open a document, a command to close a document, a search command, an input to turn on one or more filters, an input to turn off one or more filters, an input to zoom in on a map, an input to zoom out of a map, a scroll input, a swipe input, etc. The usage data can also include the order or sequences in which the user inputs or actions were made.

In some implementations, the usage data can be organized, e.g., in the data storage 112, based on the individual users of the multiple users, based on a version of the application used, and/or based on a date when the data was recorded.

Based on the determined usage patterns, the server 110 defines one or more workflows to be tested. The server 110 can define a workflow automatically, based on the prior usage data and the determined patterns. In some implementations, in addition to using the prior usage data, the server 110 also determines the workflow based in part on input from the user of the client device 105 (e.g., a selection by the user of some operations to be performed in the tested workflow). In other implementations, the workflow is selected or specified directly by the user of the client device 105 in stage (A).

In defining a workflow, the server 110 may take into account the frequency of a particular operation or a set of operations, such that more frequent operations are more likely to be included in a workflow. Similarly, the server 110 may combine operations that are more likely to be performed together into a single workflow.

The server 110 may define one workflow or may define multiple workflows to be tested on the devices selected in stage (A) (e.g., mobile devices 140a-140c). For example, as shown, the server 110 has created a first workflow 114 containing the operations of (i) opening a document, (ii) browsing to page 17 of the document, (iii) setting a filter control on, (iv) zooming in on a map, etc. (e.g., Workflow 1). In this example, the server 110 has also created a second workflow 116 containing the operations of (i) opening a dataset, (ii) running a query, (iii) selecting records, (iv) applying a function, (v) creating a line chart, etc. (e.g., Workflow 2).

In stage (C), the server 110 generates a server environment 150 that is configured based on the server parameters defined in stage (A). As discussed above, server environment 150 can be a virtual, cloud-computing-based virtual environment. Server environment 150 may be managed/hosted by second server 120 or by another third-party.

Once a server environment 150 has been created, the server 110 may modify the application installer for the selected build version(s) of the application such that the remote mobile devices 140a-140c will communicate with the server environment 150 once the selected build version(s) of the application is installed on the mobile devices 140a-140c. Alternatively, the server 110 may provide an additional set of instructions for the mobile devices 140a-140c so that they will communicate with the server environment 150 once the selected build version(s) of the application is installed on the mobile devices 140a-140c.

The server environment 150 may store or access testing datasets and testing documents that can be used in the simulated usage of the application. During testing of the selected build version(s) of the application on the mobile devices 140a-140c, server environment 150 may provide the mobile devices 140a-140c access to the testing datasets and testing documents. Operations may be performed on these testing datasets and testing documents during the simulated usage of the application. In the process of validating the workflow 114, mobile devices 140a-140c may open a document contained in the testing documents and browse to page 17 of the opened document. In the process of validating the workflow 116, mobile devices 140a-140c may open a dataset from the testing datasets and run a query on the dataset, select records contained in the dataset, apply a function to the dataset, and/or create a chart from the dataset.

In stage (D), the server 110 communicates with the second server 120 to obtain access to the mobile devices 140a-140c. Server 120 may be part of a cloud computing platform and mobile devices 140a-140c may be provided as part of a mobile device farm for that cloud computing platform. Therefore, server 120 may be able to provide access to these remote devices, mobile devices 140a-140c. During this stage, the server 110 provides server 120 with the selection of mobile devices made by the user of the client device 105 in stage (A) that may indicate one or more device models, one or more manufacturers, hardware configurations, and/or software configurations (e.g., operating systems, versions of an operating system, etc.). Based on this information, server 120 allocates a set of mobile devices. In the example of FIG. 1, server 120 selects the mobile devices 140a-140c.

The server 110 also provides the application installers for the selected version(s) of the application to be tested. The server 110 may provide this information to the mobile devices 140a-140c through the server 120 or through an API for communicating with the mobile device 140a-140c. The server 110 also provides the mobile device configuration parameters as defined by the user of the client device 105 in stage (A). The server 110 may also provide the server 120 a set of instructions for the mobile devices 140a-140c so that they can communicate with the server environment 150 once the selected build version(s) of the application is installed on the mobile devices 140a-140c.

In stage (E), having obtained access to (e.g., control of) the mobile devices 140a-140c through server 120 or appropriate API, the server 110 initiates the installation of the selected build version(s) of the application on each of the mobile devices 140a-140c. Here, the server 120 sends the application installer for the selected build version(s) of the application to be tested to each of the mobile devices 140a-140c. Server 120 may also send an additional set of instructions to each of the mobile devices 140a-140c so that they can communicate with the server environment 150 after installation. The application installer may be in the form of an executable file or a data package. Sending the installer in this way simulates the actual installation process that would typically use a digital distribution platform (e.g., App Store). Based on the modification to the application installer or additional instructions provided by server 110, once the installation process is complete, mobile devices 140a-140c are able to communicate with server environment 150.

In stage (F), performance and success of the installation process is measured and reported for each mobile device 140a-140c. Each of the mobile devices 140a-140c may log progress reports throughout the installation process. Logging progress can include logging any errors that occur during the installation process, logging any milestones reached during the installation process, logging the total time to install, logging the time that any errors occur, and/or logging the time at which a milestone has been achieved. These reports are provided to server 110 either through server 120 or directly. Server 110 may ping the mobile devices 140a-140c periodically during the installation process to check on the progress of the installation. In some implementations, mobile devices 140a-140c send a partial report of the installation process to server 110 periodically or after identified milestones have been reached.

In stage (G), after successful installation of the selected build version(s) of the application on mobile devices 140a-140c, the server 110 initiates performance testing (e.g., testing of the workflows 114 and 116) on mobile devices 140a-140c. Where installation was successful on some devices but not others, the server 110 initiates performance testing only on the mobile devices of mobile devices 140a-140c where installation was successful. Where installation was successful on some devices but not others, the server 110 may select new devices to test the selected build version(s) of the application.

Usage of the application on each of the mobile devices 140a-140c is simulated by the server 110 instructing the mobile devices to perform a series of operations as outlined in the determined workflows 114 and 116. This involves running scripts that perform the outlined operations on each of the mobile devices 140a-140c. The mobile devices 140a-140c may interact with the server environment 150 and, thus, interact with the stored testing datasets and testing documents on the server environment during performance of the operations. For example, as part of the workflows tested, the mobile devices 140a-140c may send queries to the server environment 150, load documents served by the server environment 150, and perform other operations that rely on the server environment 150.

The workflows 114 and 116 are performed for each configuration of each of mobile devices 140a-140c and for each configuration of the server environment 150 as outlined in stage (A). In addition to testing the various device and server configurations, the system 100 may also test additional versions of the selected application. In addition to testing the various device and server configurations, the system 100 may also vary configurations (e.g., settings or options) of a given version of the application itself. As mentioned above, the system 100 can vary the device and server configurations through a range of settings or until a failure, error, or performance limit occurs.

Errors or failures that occur will be logged through the performance testing process. In addition, any performance limits that are reached will be logged as well. Logging may occur on the individual devices of mobile devices 140a-140c and on the server environment 150. A performance limit corresponds with a predetermined quality of service or performance of the application. In some implementations, the predetermined quality of service or performance represents a determined minimum satisfactory performance. Performance limits may exist for each individual in a workflow. For example, it may be predetermined that the opening of the document in workflow 114 should not take more than 3 seconds. Performance limits may also exist for the entire workflow. For example, it may be predetermined that all operations in workflow 114 should not take more than 10 seconds. If one or more performance limits are being reached on a device through the testing process, this may indicate, for example, that the device needs a greater cache size, the device needs more random-access memory (RAM) allocated to it, etc. If no performance limits are reached on a device through the testing process, this may indicate, for example, that the system 100 needs to reduce the cache size, or needs to reduce the amount of RAM allocated to the device in order to determine the limits of the device and develop a profile of the device.

In stage (H), the server 110 receives the logged performance data from the mobile devices 140a-140c and from the server environment 150, and measures the performance of each of the mobile devices 140a-140c. The server 110 may receive the log data from the mobile devices 140a-140c and the server environment 150 during performance testing in stage (G) or after testing is complete.

In stage (I), based on the received log dated and measurements, the server 110 generates and provides one or more documents 160 indicating performance of the application across the different mobile device and server configurations. In generating the document(s) 160, the server 110 may determine the configuration limits for each of the devices, determine parameter ranges for each device that results in satisfactory performance, determine an ideal configuration/ideal parameters for each of the devices, group devices based on similar performance, detect trends in performance relating to the software/hardware configuration of the device or server, determine relative weighting scores to be able to translate performance of one device to the expected performance of another device, determine relative weighting scores to be able to translate performance of one operating system or version of an operating system to another operating system or version of an operating system. The results of this analysis are provided in the document(s) 160. This document may incorporate various charts and other analytics to display the results (see FIG. 2). Server 110 sends the document(s) 160 to client device 105.

Determining which devices performed similarly can include determining which devices performed the workflow(s) or individual workflow operations within a similar amount of time with the same or a similar device (and server) configurations. Devices may also be said to perform similarly where a positive correlation exists between the performance of one or more devices and the performances of one or more other devices, even if each of the performances differ. For example, if a first group of devices consistently performs 20% worse than a second group of devices, the devices are still said to perform similarly. A determination of performance similarity may also be based on other criteria, such as, for example, response time, the frequency of errors, the type of errors, stability, accuracy of results, etc.

The information contained in the document(s) 160 produced by server 110 can serve as a profile for the devices tested or can be used to develop a profile for each of the devices tested (e.g., mobile devices 140a-140c). Each device profile corresponds with the application (and possibly the build version of the application) that was selected in stage (A).

Figure 2:
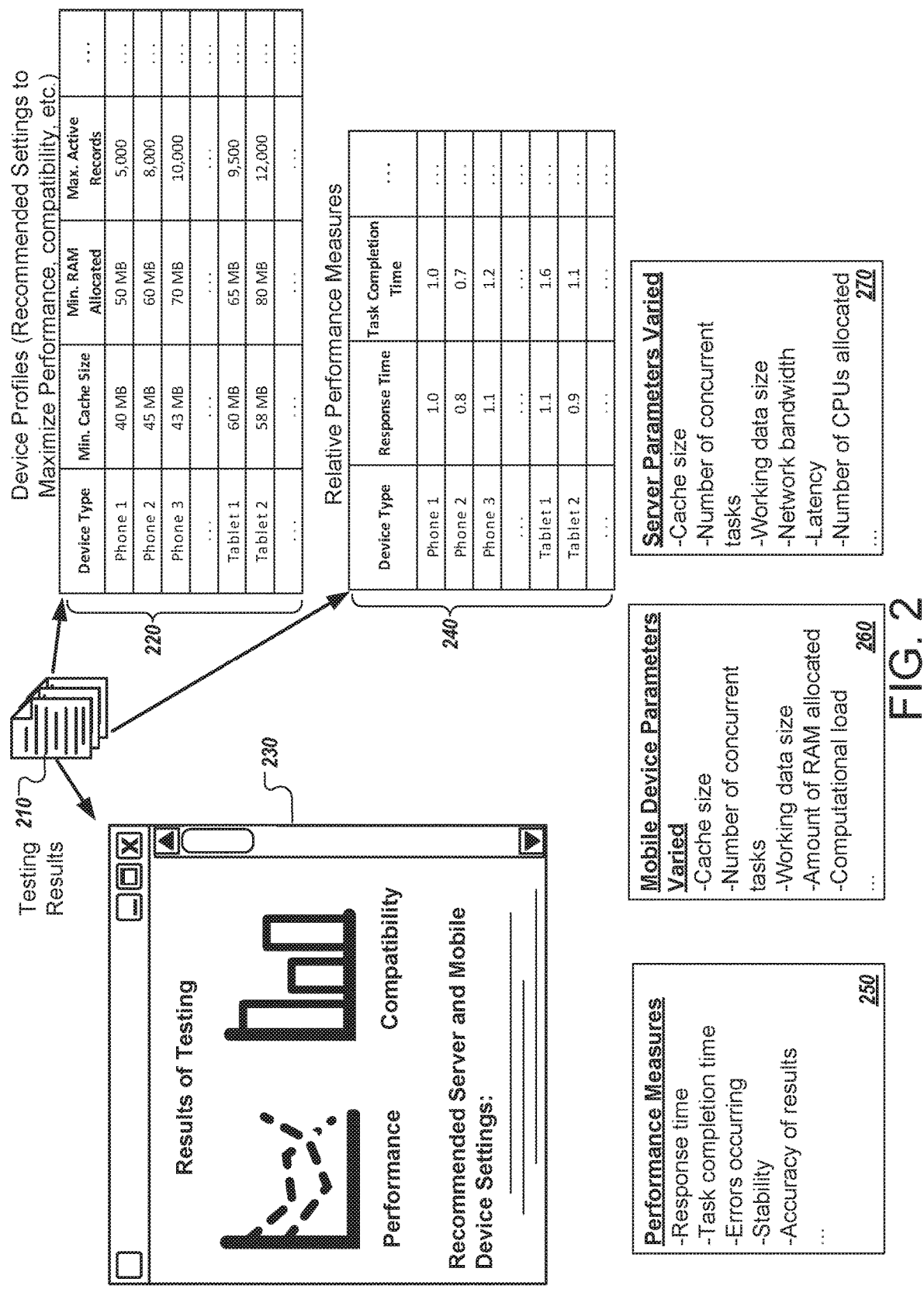
FIG. 2 is a diagram that illustrates example device profiles and performance measures.

FIG. 2 illustrates a diagram showing how the results of the testing discussed in FIG. 1 are used by the system 100. Results data 210 represents information generated or derived from combined logs generated from testing in FIG. 1. The results data 210 can indicate performance measures, errors, operation logs, and so on for each of the mobile device configurations tested as well as each of for each of the server environment configurations tested. The results data 210 can include a variety of other information, including (i) a report document or code providing a user interface 230 for presenting result data, (ii) device profiles 220 that specify the recommended settings to achieve the best performance and/or compatibility for different devices, and (iii) performance measures 240 showing performance for the different devices and device configurations (e.g., which can show differences in performance among devices and device configurations).

The user interface 230 provides a summary of the results of testing, and can indicate recommendations and settings determined to be most effective. The user interface 230 can include interactive controls to access and compare settings and results for different tests, including to filter or organize results by device type, operating system, operating system build version, application build version, individual settings or combinations of settings, and so on. The user interface 230 can be provided by client device 105 as shown in FIG. 1.

The device profiles 220 indicate the recommended settings that the server 110 calculated to provide the best overall performance for the different devices. Over the course of testing, the system 100 performs tests on each device with many different combinations of settings and measures the results. From these results, the server 110 selects the combinations of settings that best satisfy a set of one or more criteria (e.g., maximizing throughput, minimizing response time, minimizing errors, compatibility with a set of application features, etc.). In some implementations, the server 110 selects, for each mobile device, the tested combination of settings that best meets predetermined criteria set. In other implementations, the server 110 may generate a new combination of settings for a device based on an aggregation of tests for multiple configurations (e.g., using a network configuration from one testing cycle that resulted in high network bandwidth, and using a cache setting from a different testing cycle that resulted in low access latency).

In FIG. 2, the device profiles 220 are shown in a table where each row represents a profile for a different device. For example, the first row corresponds to a particular device type, referred to as "Phone 1." The device type can be defined in any of various ways, for example, as a specific hardware configuration (e.g., a specific model of mobile device), as a class or category of hardware configurations, as a specific software configuration (e.g., for an operating system and/or application, potentially for specific versions of them), as a class or category of software configurations, and/or for combinations of hardware and software characteristics. For example, the device type "Phone 1" represents a specific model of mobile phone, and the profile information specifies the recommended settings to achieve high performance of the application tested in FIG. 1. As another example, the profile specifies that the minimum cache size for this device is 40 MB, the minimum RAM allocated for the application should be 50 MB, the maximum number of active records that should be allowed for the application is 5,000, and so on. As shown in FIG. 2, different device types, which have different hardware and/or software characteristics, often perform best with different combinations of settings. Accordingly, separate profile information can be generated and stored for each of the different device types tested. A device profile may be created for each device or device type for each application tested. Alternatively, a device profile may be created for each device or device type for each build version of an application tested.

Once the device profiles have been generated, the device profiles may be published to actual user devices. In some implementations, the device profiles can be included in application installers or application updates that are provided to devices, so that a mobile device receiving the application information can identify which profile corresponds to the device, extract the settings information from the profile, and apply the extracted settings for the application to optimize performance. In some implementations, the user interface 230 or another user interface may be used to accept or assign device profiles for different device types.

The server 110 can generate device profiles for device types that were not specifically tested. In these cases, the server 110 selects a representative device for which performance has been measured, and then can adjusts the values for the representative device's profile to account for differences between the new device and the representative device. From the information about tests that were performed, the server 110 can cluster different mobile devices according to their behavior (e.g., performance levels, errors encountered, functionality supported, etc.). The server 110 can also access information about the hardware and software specifications of the devices actually tested. With this information, the server 110 can learn the relationships between the hardware and software characteristics of the devices and the behavior they exhibit. For example, the server 110 can infer the impact of different CPU speeds, RAM amounts, and operating system versions on each of various performance measures. In a similar manner, the server 110 can determine the relationships between device profile settings and the hardware and software characteristics of the devices.

To support a new, untested device, the server 110 may select the tested device having the most similar hardware and software characteristics to the untested device, and use the selected device's profile as a starting point. The server 110 may use the selected device's profile for the untested device, or may adjust one or more settings based on differences in configuration between the two devices. For example, if an untested device has twice as much RAM as the tested device, memory usage limits may be scaled accordingly to make better use of the new device's greater capabilities.

The server 110 generates the performance measures 240, which facilitate comparison of performance among different device types. Similarities identified in the performance of different devices can also enable future testing to be streamlined. The performance measures 240 can indicate, for each device type, one or more performance measures (e.g., response time for the device, task completion time for the device, etc.). In the example, the performance measures are relative, being normalized with respect to the performance of the first device, "Phone 1." In this manner the performance measures shown can be used as a scaling factor or a weighting to convert performance measures for one device to an estimated performance measure for another device. For example, if completing a certain task using Phone 1 takes 2.5 seconds, the server 110 can estimate the task completion time for Phone 2 to be 0.7×2.5=1.75 seconds.

Once a sufficient amount of testing has been performed to be able to determine the performance measures 240 to relate performance of devices with respect to each other, the scope of future testing can be greatly reduced to improve efficiency. For example, testing may be performed only on a representative device that represents the a broader class of devices (e.g., phones having between 1 GB and 2 GB of RAM and running a particular operating system). Then, rather than testing each device type, the server 110 can initiate testing for just a few representative devices for different groups of device types. Results of the testing of a representative device can then be adjusted for each of the other similar device types, by applying relative performance measures 240 as scaling factors or weights.

In more detail, the system, e.g., the server 110, can determine that the different devices and/or the different types of devices perform similarly by comparing the corresponding performance measures 240 (e.g., the response times, the task completion times, the error occurrences, the stabilities, and/or the accuracy of results) between the different devices and/or the different types of devices. Determining that the different devices and/or the different types of devices perform similarly can include determining that one or more of the performance measures of a device or a type of device are within a threshold percentage (e.g., 2%, 5%, 10%, or the like) of the one or more performance measures of another device or another type of device, and/or that one or more of the performance measures of a device or a type of device correlate to the one or more performance measures of another device or another type of device within a threshold percentage (e.g., 2%, 5%, 10%, or the like). The correlation can be, for example, a linear relationship (e.g., with an offset), an inverse relationship, a quadratic relationship, or the like. Based on determining that the different devices and/or the different types of devices perform similarly, the system, e.g., the server 110, can estimate the performance measures for one or more devices and/or one or more types of devices without directly testing those one or more devices and/or one or more types of devices.

The performance measures 240 can be used by the system, e.g., the server 110, to determine one or more device profiles 220 for mobile devices. A device profile can be a set of configurations for hardware and/or software, e.g., configuration settings. These configurations settings can include, for example, a minimum cache size to allocate, a minimum amount of RAM to allocate, a maximum number of active records that can be used with the application, or the like. Different device profiles can be determined for different types of devices (e.g., tablet computer, phone, wearable device, etc.), for different models of devices (e.g., different models of phones, or phones with different hardware), for different operating systems or different versions of the same operating system, and so on. Similarly, different device profiles can be determined for different applications or for different versions of a single application (e.g., different build versions or releases of the application), with respect to different device types, device models, and/or operating systems. Thus, device profiles may be generated to enhance the performance and compatibility of an application on different mobile platforms, such as different application/device combinations. Of course, if there the similarities between different devices such as similar responses demonstrated by the performance measures 240, the server 110 may use a single device profile for a broad class of devices, or use different device profiles respectively for groups of devices. As an example, the device profiles 220 include multiple device profiles, one profile for each device type. The device profiles 220 can be determined based on the performance measures 240.

The system, e.g., the server 110 can associate the device profiles with the application or the specific version of the application tested. For example, the server 110 can update the installer for the application to select and apply an appropriate set of configuration settings based on the performance measures 240. For example, the server 110 can update the installer to include various device profiles 220 that include different sets of settings for different mobile devices. Upon installation, the installer can detect the type of device the application is being installed on, select the corresponding device profile 220, and apply or recommend the settings in the selected device profile 220. Alternatively or additionally, the server 110 can transmit the device profile(s) to mobile devices after an application is installed to cause devices to be updated to the determined configuration settings that were determined based on the performance measures 240. In this way, the server 110 may use information obtained through the testing process to enhance the configuration and performance of the application for mobile devices that have previously had the application installed.

The system, e.g., the server 110, can manage the devices, or the application to be tested remotely to automatically cause the determined configuration settings to be applied. For example, once configuration settings are determined for the devices 140a-140c (e.g., once device profiles 220 are generated for the devices 140a-140c), the configuration settings for the devices 140a-140c can be automatically updated so that any future tests of the application, or for the specific version of the application are conducted with the devices 140a-140c having the updated configuration settings. Similarly, once configuration settings are determined for the application or for the specific version of the application (e.g., once a configuration profile is generated for the application and/or for the specific version of the application), the server 110 can automatically update the application installer.

The system, e.g., the server 110, can provide the configuration profiles containing the recommended configuration settings to the client device 105 or another device. These configuration profiles and/or the included configuration settings can be output to a user interface of the client device 105 or of another device for a user to view. For example, the settings information can be provided to an end user of the mobile device, for an administrator (e.g., an information technology technician), or an app developer for the application. The user, administrator, or app developer can accept all of the recommended configuration settings, can reject all of the recommended configuration settings, can accept one or more of the recommended configuration settings, can reject one or more of the recommended configuration settings, and/or can modify one or more of the configuration settings.

The system, e.g., the server 110, can recommend the configurations setting it determines to an administrator or app developer. For example, the server 110 can send the determined configuration settings to the client device 105 with a request to accept or reject the configuration settings.

The system, e.g., the server 110, can update compatibility indications in the software itself or on a website. Compatibility can be determined by the system, e.g., the server 110, based on the performance measures 240. For example, the server 110 can adjust the app software to change which devices different versions of the app will install or run on based on the performance measures 240. Similarly, the server 110 can adjust an indication of which app versions are available for different devices based on the performance measures 240.

The system, e.g., the server 110, can recommend the determined configuration settings to an end user. For example, the server 110 can send one or more of the configuration profiles to a mobile device of a user for display on a user interface of the mobile device. Accordingly, the recommended configuration settings can be displayed on the user interface of a user's mobile device. The user can also be presented one or more controls on the user interface to apply the settings in the device profile 220. These controls can let the user, for example, adjust the recommended settings (to a certain degree), select one or more of the recommended settings to use, update their device, update their device type, update their hardware information (e.g., processor, RAM, or the like), select a performance mode they would like to use (e.g., low performance mode that requires a relatively low amount of resources, high performance mode that requires a relatively large amount of resources, or medium performance mode that requires less resources than high performance mode but more resources than low performance mode). The configuration settings can be selected to improve performance and efficiency, e.g., to lower response time, increase throughput, lower resource usage (processor, RAM, etc.), or the like.

Elements 250, 260, and 270 show examples of types of data used by the server 110 to conduct the tests of FIG. 1. As an example, the first element 250 includes performance criteria for testing can include response time, task completion time, errors occurring, stability, and accuracy of the results. The server 110 (as shown in FIG. 1) may group devices that perform similarly. As discussed above, a representative device may be chosen from a group of devices that have been determined to perform similarly (e.g., within a threshold level or range of each other). After a representative device is chosen, further testing of the application or of the specific build(s) of the application may be limited so that it is performed only on the representative device, thus reducing the amount of testing needed and the associated time and power consumption. The results of the testing and validation of subsequent workflows or application builds can be used to not only adjust the parameters of the application for the representative device but for all devices that had initially performed similarly to the representative device, with weightings being applied based on the relative performance measures 240.

As shown in FIG. 2, the second element 260 includes mobile device parameters that can be varied during the testing process. The mobile device parameters can include, for example, cache size, the number of concurrent tasks, the working data size, the amount of RAM allocated, and the computational load. Similarly, the third element 270 includes server parameters that can be varied during the testing process. The server elements can include, for example, cache size, the number of concurrent tasks, working data size, network bandwidth, latency, and the number of CPUs allocated.

Figure 3:
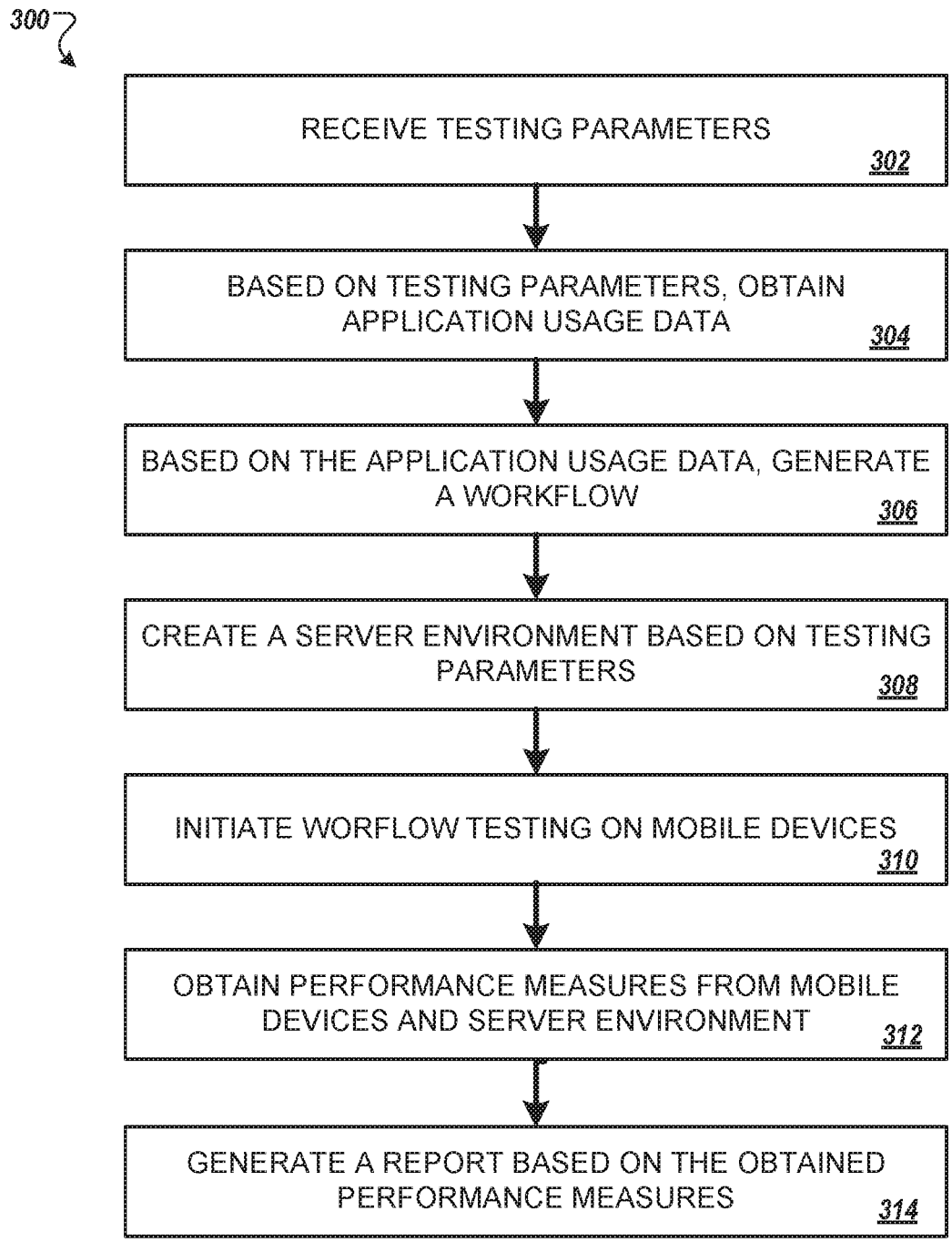
FIG. 3 is an example process for generating and testing a workflow on multiple devices.

FIG. 3 is an example process 300 for generating and testing a workflow on multiple devices. The process 300 can be performed, at least in part, using the system 100 described herein.

The process 300 includes a computer system (e.g., a server system) receiving testing parameters from a client device (302). Testing parameters can include the application to be tested, the build version(s) of the application to be tested, a selection of mobile devices to be tested, the mobile device parameters to be tested, and the server parameters to be tested.

The process 300 includes the computer system obtaining application usage data from a database based on the testing parameters received from the client device (304). Obtaining application usage data can include accessing usage data indicating previous usage of the mobile device application by multiple users.

The process 300 includes the computer system (e.g., server system) generating a workflow based on the application usage data (306). Generating a workflow based on the application usage data includes determining a sequence of operations. These operations may be found in the usage data, having previously been performed by application users.

The process 300 includes the computer system (e.g., server system) creating a server environment based on the received testing parameters (308). This server environment may contain documents and data sets and may be configured to make these documents and data sets made available to the application over a network during testing. This server environment may be a cloud-based virtual server environment.

The process 300 includes the computer system (e.g., server system) initiating workflow testing on mobile devices (310). This initiation occurs after the application has been installed on the remote mobile devices (not shown) or concurrently with the installation. Installation of the application on the mobile device can include configuring the application installers so that the mobile devices are able to communicate with the server environment. Workflow testing can include providing input to the application running on the remote mobile devices that simulates user input causing the application to perform the sequence of operations for the workflow. Workflow testing can include varying operating parameters of the application on the mobile devices or a server environment in communication with the mobile devices to operate each of the mobile devices in a plurality of different configurations.

The process 300 includes the computer system (e.g., server system) obtaining performance measures from each of the mobile devices and from the server environment (312). Measuring performance of the remote mobile devices during the simulated usage can include validating results generated by the respective mobile devices with respect to a set of reference results. Measuring performance of the remote mobile devices during the simulated usage can include measuring at least one of response time, error occurrence, task completion time, accuracy of results, or system stability.

The process 300 includes the computer system (e.g., a server system) generating a report based on the performance measures (314). This report may be in the form of a document. This report may contain various analytics of the results of the performance testing. Generating this report can include determining, based on the performance measures for each of the different configurations, different limits on operating parameters of the application on the different mobile devices needed to achieve one or more performance criteria. These limits may be included in the generated report. Generating this report can include determining, for each of multiple mobile device types, a device profile that specifies one or more limits for the operating parameters of the application for operating on mobile device of the mobile device type. These device profiles may be included in the generated report.

Figure 4:
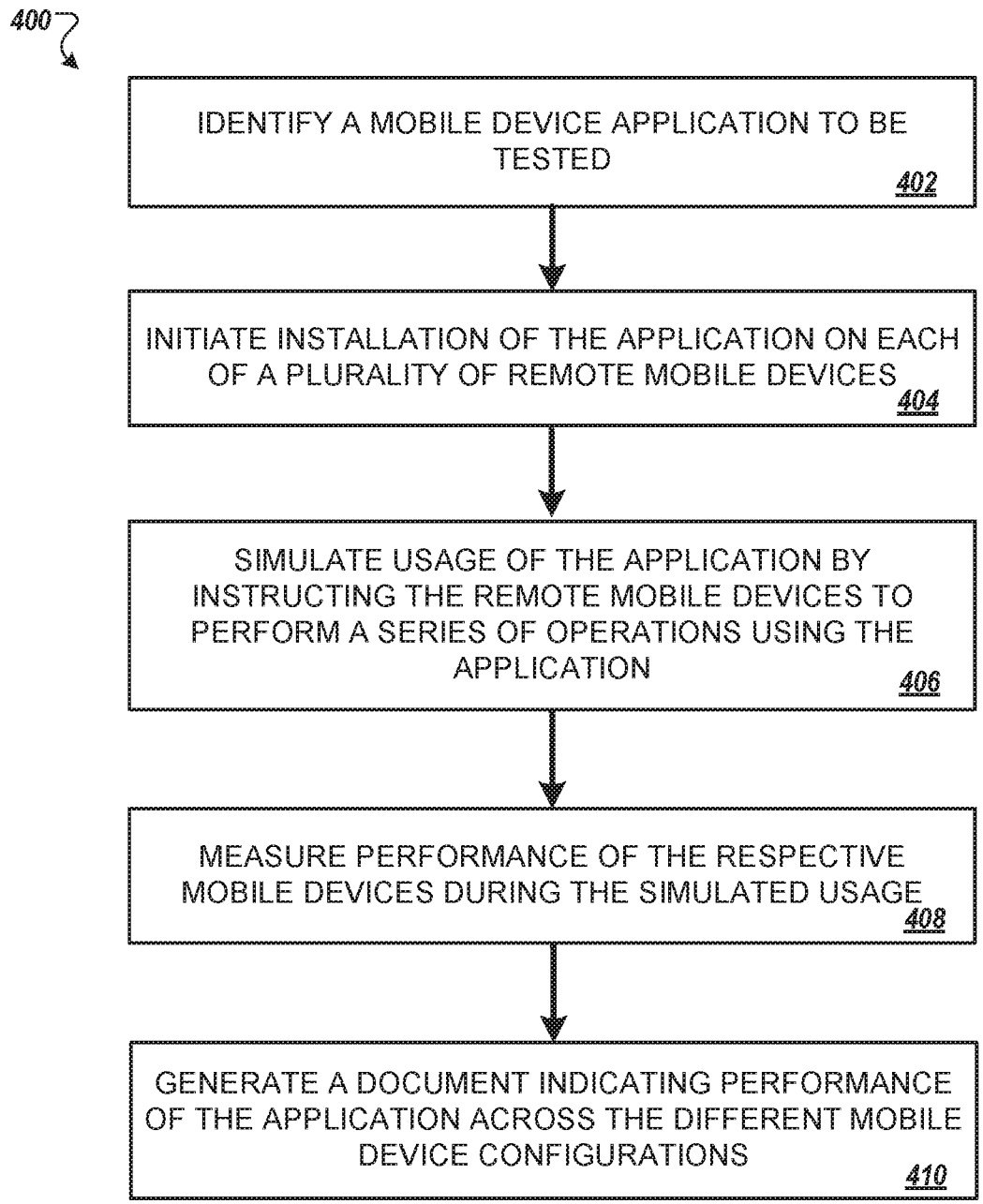
FIG. 4 is an example process for generating and testing a workflow on multiple devices.

FIG. 4 is an example process 400 for generating and testing a workflow on multiple devices. The process 400 can be performed, at least in part, using the system 100 described herein.

The process 400 includes identifying a mobile device application to be tested (402). Identifying a mobile device application can include identifying one or more build versions of the mobile device application to test. For example, identifying a mobile device application can include identifying a build version for development and/or a build version for release. Each build version may correspond to a different version of the application, e.g., the version at a different point in the process of development or based on a different version or set of source code files and other resources.

The process 400 includes initiating installation of the application on each of a plurality of remote mobile devices, including mobile devices having different configurations (404). Different configurations can be defined as one or more of the remote mobile devices having a different set of parameters with respect to the other remote mobile devices. With respect to FIG. 1, the user of the client device 105 can choose multiple device configurations for the devices 140a-140c, or a set of device configurations having a range of one or more parameters (e.g., testing random-access memory allocation at different increments from 16 MB up to 100 MB) to be tested. In some cases, the configurations of the remote mobile devices are automatically varied. For example, the system 100, e.g., through the server 120, can test various device configurations by varying the parameters of the devices 140a-140c, potentially until an error, failure, or performance limit occurs.

The parameters used for testing and to define a configuration of a mobile device can include, for example, data cache size, working data amount for operations of the selected application, an amount of memory allocated to the selected application or a portion of the selected application (e.g., an amount of random-access memory), an amount of CPU allocation (e.g., a number of cores of a CPU) for the selected application or portion of the selected application, a level of concurrency of the operations, a computational load of operations performed, and/or operating system settings on the mobile device.

The parameters used for testing can also include server parameters. For example, the server parameters can include network bandwidth, latency, cache size, a number of CPUs allocated, a working data amount for operations performed, an amount of memory (e.g., random-access memory), and/or a software version used in the in server environment for testing. These parameters can be varied during testing.

In some implementations, the user of the client device 105 does not set the range of the one or more parameters. In this case, the system 100 will test various configurations by varying the parameters for the server, potentially until an error, failure, or performance limit occurs.

In some cases, the plurality of remote mobile devices include mobile phones from different manufacturers. For example, the remote mobile devices can include one or more iPhones and one or more Google Pixels. In some cases, the plurality of remote mobile devices include mobile phones running different operating systems. For example, the remote mobile devices can include one or more devices running iOS and one or more other devices running Android. In some cases, the plurality of remote mobile devices include mobile phones running different operating system versions. For example, the remote mobile devices can include one or more devices running Android Jelly Bean 4.1 and one or more other devices running Android KitKat 4.4. In some cases, the plurality of remote mobile devices include mobile phones from different manufacturers and running different operating systems. In some cases, the plurality of remote mobile devices include mobile phones from different manufacturers and running different operating system versions.

In some cases, initiating installation includes remotely initiating installation of the mobile device application on each of a plurality of remote mobile devices of different configurations. Each of the plurality of remote mobile devices can be operated by and made accessible by a third-party provider over a communication network. The third-party provider can include, for example, a cloud computing platform (e.g., Amazon Web Services (AWS), Microsoft Azure, and so on). The third-party provider can provide or provide access to a mobile device farm or device bank and can allow configuration and allocation of the devices through an application programming interface. The plurality of remote mobile devices can be part of the mobile device farm or device bank.

In some cases, the process 400 optionally includes testing installation of the application on each of the plurality of remote mobile devices. Testing the installation of the application on each of the plurality of remote mobile devices can include, for example, logging errors of installation processes executing on each of the remote mobile devices. With respect to FIG. 1, the errors that arise during the application's installation process can be logged by the server 120 and sent to the server 110 by the server 120. The server 110 can include the logged errors in the document(s) 160 or in a separate document. The server 110 can send the logged errors of the application's installation process to the client device 105. Testing the installation of the application on each of the plurality of remote mobile devices can also or alternatively include, for example, measuring performance of the installation processes executing on each of the remote mobile devices. The performance of the application's installation process can be monitored and measured by the server 120 and sent to the server 110 by the server 120. As an example, the server 120 can monitor the installation time for the application on each of the devices 140a-140c, can monitor for a confirmation that installation has completed from each of the devices 140a-140c, can monitor for errors that can arise during installation of the application on each of the devices 140a-140c, or the like. The server 110 can include the measured performance of the application's installation process in the document(s) 160 or in a separate document. The server 110 can send the measured performance of the application's installation process to the client device 105.

The process 400 includes simulating usage of the application by instructing the remote mobile devices to perform a series of operations using the application (406). The series of operations can be determined using usage data indicating how users have used the application in the past, e.g., over a certain time period. The simulated usage can replicate or recreate the types of actions, frequency of actions, sequences of actions, and even specific actions indicated by the usage data that indicates historical actions of users using the application. The usage data can be previously collected from one or more users while they were using the application, e.g., using a prior version of the application such as the last released version of the application. The usage data can indicate the operations that were performed by the one or more users of the application. The usage data can indicate a frequency of operations performed. For example, the usage data can indicate those operations that were most frequently performed by application users. The usage data can indicate a sequence or order in which the operations were performed by the application users. The usage data can indicate the actual inputs provided by the one or more users while they were using the application. The usage data can indicate a frequency of inputs provided. The usage data can indicate a sequence or order in which the inputs were provided by the application users.

In some cases, simulating usage of the application includes causing the application to perform operations using documents and data sets served by a server system over a network. For example, with respect to FIG. 1, simulating usage of the application running on the devices 140a-140c can include causing the application being tested to perform operations using the testing documents and/or testing data sets stored on the server environment 150. The server environment 150 can serve the testing documents and/or the testing datasets to the devices 140a-140c over the network 130. The server environment 150 can be generated in order to test the application running on the devices 140a-140c. The testing documents and/or testing datasets can be generated using the stored application usage data. For example, one or more documents can be added to the testing documents based on the application usage data indicating that users frequently interact with this particular document or with documents of the same type.

In some cases, the process 400 optionally includes configuring a particular cloud-based virtual server environment to serve the documents and data sets used in the simulated usage of the application. For example, with respect to FIG. 1, the server environment 150 can be a cloud-based virtual server environment and can be used to server the testing documents and/or testing data sets to the devices 140a-140c. Configuring the particular cloud-based virtual server environment can include selecting the server parameters for the server environment during all or a portion of testing. The server parameters can include the network bandwidth, the latency, the cache size, the number of CPUs allocated, the working data amount for operations performed, an amount of memory (e.g., random-access memory), and/or a software version used in the particular cloud-based virtual server environment.

In some cases, the process 400 optionally includes configuring the application installations on the remote mobile devices to communicate with the particular cloud-based virtual server environment. For example, with respect to FIG. 1, the application installations on the devices 140a-140c can be configured to communicate with the server environment 150.

In some cases, the process 400 optionally includes accessing usage data indicating previous usage of the mobile device application by multiple users. For example, the usage data can include records of actions or operations that different users performed using the application, e.g., records of individual usage instances and/or aggregated data about usage. In some implementations, the usage data can include or include an indication of the application operations that are always performed by the multiple users (e.g., performed by 100% of the multiple users, and/or have a 100% chance of being performed by one or more of the multiple users within a given time period or session), the application operations that are frequently performed by the multiple users (e.g., performed by 75% or more of the multiple users, and/or only have a 75% chance or greater of being performed by one or more of the multiple users within a given time period or session), the application operations that are sometimes performed by the multiple users (e.g., performed by 25%-75% of the multiple users, and/or only have a 25%-75% chance of being performed by one or more of the multiple users within a given time period or session), the application operations that are rarely performed by the multiple users (e.g., performed by only 25% or less of the multiple users, and/or only have a 25% chance or less of being performed by one or more of the multiple users within a given time period or session), and/or the application operations that are never performed by the multiple users (e.g., performed by 0% of the multiple users, and/or have a 0% chance of being performed by one or more of the multiple users within a given time period or session). The usage data can include data collected over a given time period. For example, the usage data can include data collected over the last week, the last month, the last year, or the like. The usage data can include data collected on a single version of the application, such as the last released version of the application. Alternatively, the usage data can include data collected on multiple versions of the application, such as the two or three most recent application versions. The usage data can also indicate the order or sequences in which each of the multiple users performed the operations on the application.

In some cases, the usage data includes or includes indications of prior inputs and actions made by multiple users when using the application. Prior user inputs and actions can include, for example, a command to open a document, a command to close a document, a search command, an input to turn on one or more filters, an input to turn off one or more filters, an input to zoom in on a map, an input to zoom out of a map, a scroll input, a swipe input, etc. The usage data can also include the order or sequences in which the user inputs or actions were made.

In some cases, the usage data can be organized, e.g., in the data storage 112, based on the individual users of the multiple users, based on a version of the application used, and/or based on a date when the data was recorded.

In some cases, the process 400 optionally includes defining a workflow that includes a sequence of operations of the mobile device application. The sequence of operations can be determined based on sequences of user inputs indicated by the usage data. For example, with respect to FIG. 1, the sequences of users inputs stored as part of the application usage data in the data storage 112 can indicate that users often (e.g., greater than 50% of the time in a given time period, or during a given session) provide an input to open a dataset, followed by input to run a query, followed by input to select one or more records, followed by input to apply a function to the selected one or more records, and followed by an input to create a line chart. The server 110 can use these inputs to determine a set of operations to add to a workflow and an arrangement of operations in the workflow. For example, the server 110 can use the stored user inputs to generate the workflow 116.

In some cases, previous usage of the application means use of a version of the application that is different than the version to be tested. For example, previous usage of the application can be previous usage of a previously released version(s) of the application, such as the last released version of the application, the last two released versions of the application, the last three versions of the application, or the like.

In some cases, simulating usage of the application comprises providing input to the application running on the remote mobile devices that simulates user input causing the application to perform the sequence of operations for the workflow.

The process 400 includes measuring performance of the respective mobile devices during the simulated usage (408). Measuring performance of the respective mobile devices can include, for example, detecting one or more response times, one or more task completion times, and/or a number of errors for each of the mobile devices. Measuring performance of the respective mobile devices can also or alternatively include, for example, determining an error frequency, a system stability, and/or an accuracy of results for each of the mobile devices. Accordingly, the performance measures for each of the different configurations can include, for example, one or more response times, one or more task completion times, a number of errors, an error frequency, a system stability, and/or an accuracy of results. With respect to FIG. 2, performance metrics measured can be included the results data 210 as part of the performance measures 240.

In some cases, measuring performance of the respective mobile devices during the simulated usage includes validating results generated by the respective mobile devices with respect to a set of reference results. For example, the generated results can be compared to reference results that are known to be accurate. If the generated results do not match the reference results, then the results may not be validated. However, if the generated results match the reference results, then the results can be validated.

Additionally or alternatively, the generated results can be compared to measured performance metrics for a different version of the application, such as a previously released version of the application. These measured performance metrics can include, for example, a response time, a task completion time, the number and/or severity of errors occurring, a stability of the application, and/or an accuracy of results. If the generated results indicate that the performance of the application tested on a particular device was worse than the measured performance metrics, then the generated results may not be validated. However, if the generated results indicate that the performance of the application tested on a particular device was the same or better than the measured performance metrics, then the generated results can be validated.

Additionally or alternatively, the results can be compared to one or more expected performance metrics, e.g., calculated for the particular device tested. These expected performance metrics can include, for example, a response time, a task completion time, the number and/or severity of errors occurring, a stability of the application, and/or an accuracy of results. If the results indicate that an application tested on a particular device performed worse than the expected performance metrics, then the results may not be validated. However, if the results indicate that an application tested on a particular device performed the same or better than the expected performance metrics, then the results can be validated.

In some cases, measuring performance of the respective mobile devices, e.g., the mobile devices 140a-140c shown in FIG. 1, during the simulated usage includes measuring at least one of response time, error occurrence, task completion time, accuracy of results, or system stability. System stability can be based on the error occurrence, the response time, and/or the task completion time.

In some cases, the process 400 optionally includes varying operating parameters of the application on the mobile devices or a server environment in communication with the mobile devices to operate each of the mobile devices in a plurality of different configurations. For example, varying the operating parameters of the application on the mobile devices can include varying at least one of a size of a data cache on the mobile device, a working data amount for tasks of the application, an amount of memory allocated to the application or a portion of the application, a level of concurrency of tasks, a computational load of tasks performed, or a level of network bandwidth required for tasks. Varying the operating parameters of the application on the server environment can include varying at least one of a size of a cache for the server environment, a working data amount for tasks performed, an amount of memory allocated, an amount of processors allocated, or a software version used in the server environment. As an example, with respect to FIG. 1, the server environment 150 can control the changes to the operating parameters during the testing of the application on the devices 140a-140c.

In some cases, simulating usage of the application includes, for each of the mobile devices, simulating usage of the application installed on the mobile device with the application operating in the different configurations that use different operating parameters of the application or the server environment. A configuration can be defined by the parameters of the application on the mobile device being tested and/or the parameters of the server environment. The parameters of the application on the mobile device can include, for example, data cache size, working data amount for operations of the selected application, an amount of memory allocated to the selected application or a portion of the selected application (e.g., an amount of random-access memory), an amount of CPU allocation (e.g., a number of cores of a CPU) for the selected application or portion of the selected application, a level of concurrency of the operations, a computational load of operations performed, and/or operating system settings on the mobile device. These parameters can be varied during testing. The parameters of the server environment can include, for example, network bandwidth, latency, cache size, a number of CPUs allocated, a working data amount for operations performed, an amount of memory (e.g., random-access memory), and/or a software version used in the in server environment for testing. These parameters can also or alternatively be varied during testing.

In some cases, measuring performance of the respective mobile devices includes, for each of the mobile devices, measuring performance of the mobile device to determine performance measures for each of the different configurations that use different operating parameters of the application or the server environment. Measuring performance of the mobile device can include, for example, detecting one or more response times, one or more task completion times, and/or a number of errors. Measuring performance of the mobile device can also or alternatively include, for example, determining an error frequency, a system stability, and/or an accuracy of results. Accordingly, the performance measures for each of the different configurations can include, for example, one or more response times, one or more task completion times, a number of errors, an error frequency, a system stability, and/or an accuracy of results.

In some cases, the process 400 optionally includes determining, based on the performance measures for each of the different configurations, different limits on operating parameters of the application on the different mobile devices needed to achieve one or more performance criteria. Performance criteria can include, for example, one or more maximum response times, one or more maximum task completion times, a maximum number of errors, a maximum error frequency, a minimum system stability, and/or a minimum result accuracy. Limits on the operating parameters can include, for example, a minimum cache size, a minimum RAM allocated, a maximum number of active records, or the like. The limits on the operating parameters can be specific to the particular device make, the particular device model, to the operating system running on the particular device, to the processor of the particular device, and/or to the memory of the particular device. With respect to FIG. 2, the different limits on operating parameters can be included in the results data 210 as part of the device profiles 220.

In some cases, the process 400 optionally includes determining, for each of multiple mobile device types, a device profile that specifies one or more limits for the operating parameters of the application for operating on mobile device of the mobile device type. The device type can be defined in any of various ways, for example, as a specific hardware configuration (e.g., a specific model of mobile device), as a class or category of hardware configurations, as a specific software configuration (e.g., for an operating system and/or application, potentially for specific versions of them), as a class or category of software configurations, and/or for combinations of hardware and software characteristics. For example, the device type "Phone 1" represents a specific model of mobile phone, and the profile information specifies the recommended settings to achieve high performance of the application tested in FIG. 1. As another example, the profile specifies that the minimum cache size for this device is 40 MB, the minimum RAM allocated for the application should be 50 MB, the maximum number of active records that should be allowed for the application is 5,000, and so on. With respect to FIG. 2, the device profile can be included in the device profiles 220.

The process 400 optionally includes determining, based on the measured performance, groups of mobile device types that have similar performance. Similar performance can be defined by two or mobile devices each having one or more performance metrics that match one another, that fall within a range of values, and/or that have values that are within a threshold percentage of one another. There can be multiple threshold percentages. For example, with respect to FIG. 2, Phone 1 and Tablet 2 can be determined to have similar performance due to their response times being within 15% of one another, and due to their task completion times being within 10% of one another. Accordingly, Phone 1 and Tablet 2 can be used to form a first group of mobile device types. This first group of mobile device types would include phones that have, for example, the same make, model, operating system, processor, and/or memory of Phone 1. This first group of mobile device types would include tablet computers that have, for example, the same make, model, operating system, processor, and/or memory of Tablet 2.

The process 400 optionally includes selecting a subset of mobile device types from each group of device types and performing additional testing on devices of device types in the selected subsets of mobile device types. For example, from the first group of mobile device types, Phone 1 could be selected for additional testing.

The process 400 optionally includes characterizing performance of the mobile device types that are not in the selected subsets based on the additional testing of the devices of device types in the selected subsets. For example, the testing results from the additional testing of Phone 1 could be associated with Tablet 2 despite not performing additional testing on Tablet 2. The testing results could be used, for example, to update a profile for Tablet 2, and/or to update performance metrics for Table 2.

The process 400 includes determining, based on the measured performance, relative performance measures indicating relationships between performance characteristics of devices of different configurations. For example, with respect to FIG. 2, the relative performance measures can be the performance measures 240. The system can use the relative performance measures to determine, for example, that a larger cache size generally reduces response time and/or task response time, that the more RAM allocated generally reduces response time and/or task response time, and/or that more active records generally increases response time and/or task response time. The system can use these relationships to estimate the response time and/or task completion time for a device, e.g., a device that has yet to be tested, based on the cache size for application on the device, the RAM allocated for the application on the device, and/or a number of active records used by the application on the device.

The process 400 includes generating a document indicating performance of the application across the different mobile device configurations (410). As an example, the document can indicate the response times, task completion times, and/or number of errors detected for each of the different mobile device configurations. The document can also or alternatively indicate error frequencies, system stabilities, and/or result accuracies determined for each of the different mobile device configurations. The document can also or alternatively include operation logs for each of the different mobile device configurations. With respect to FIG. 2, the document can include the results data 210. Specifically, the document can include (i) a report document or code providing the user interface 230 for presenting result data, (ii) the device profiles 220 that specify the recommended settings to achieve the best performance and/or compatibility for different devices, and (iii) the performance measures 240 showing performance across the different devices and device configurations.

Figure 5:
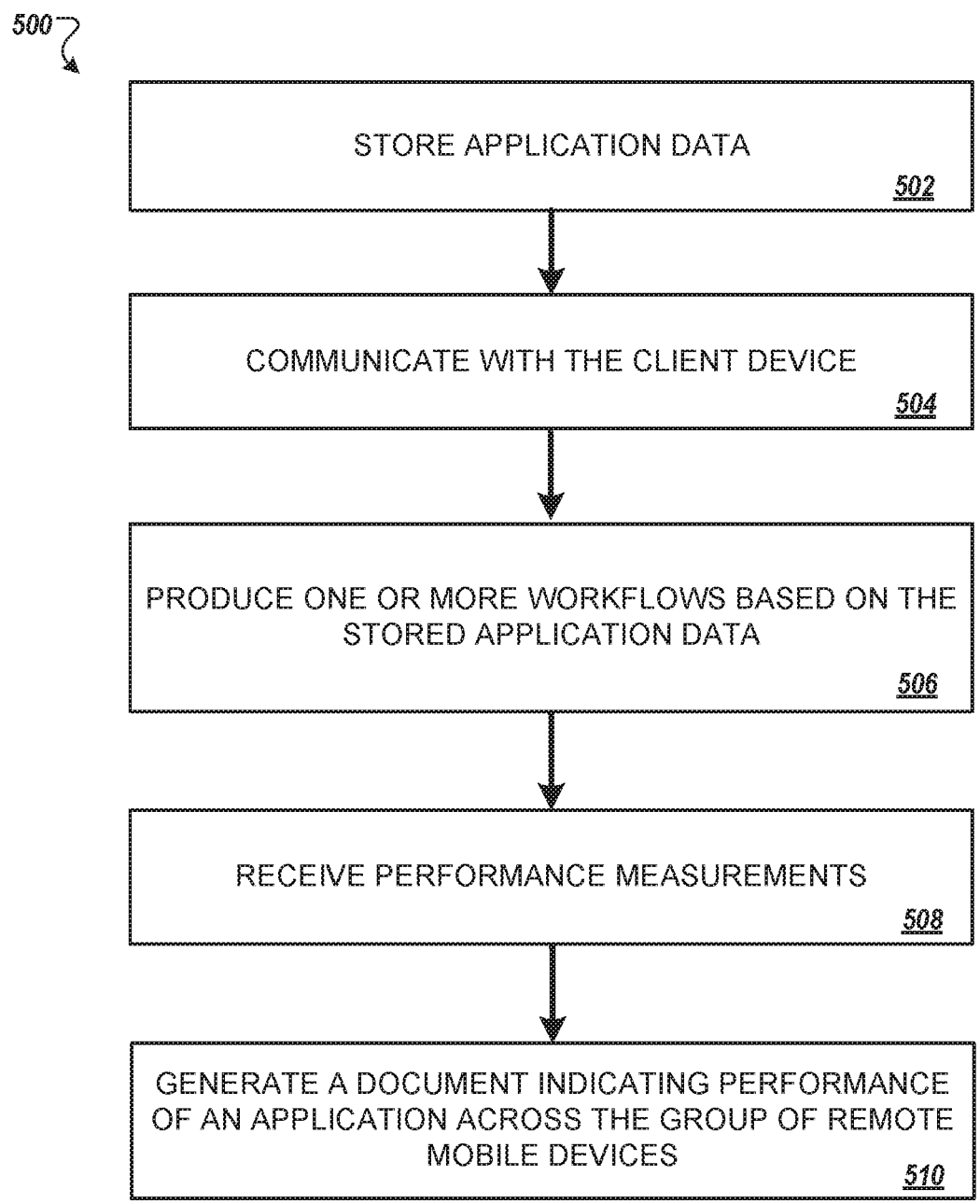
FIG. 5 is an example process for generating and testing a workflow on multiple devices.

FIG. 5 is an example process 500 for generating and testing a workflow on multiple devices. The process 500 can be performed, at least in part, using the system 100 described herein.

The process 500 includes storing application data (502). The application data can be stored on a server. The application data can include application usage data, such as the application usage data stored in the data storage 112 of FIG. 1. The application data can include application installers, such as the application installers stored in the data storage 112 of FIG. 1. The application usage data can include data specific to one or more versions of the corresponding application, such as the most recently released version of the application. The application data can be used to generate one or more workflows to be used in testing. For example, with respect to FIG. 1, the application data can be used to generate the workflows 114 and 116 to be used in the testing of remote mobile devices 140a-140c.

As an example, with respect to FIG. 1, the application data can be stored on the data storage 112 of the server 110. All or part of the application data can be stored as the application usage data. All or part of the application data can be stored as the application installers. The application data can include usage data collected from one or more applications users, such as users of one or more prior versions of the application. The usage data can indicate the operations that were performed by the one or more users of the application. The usage data can indicate a frequency of operations performed. For example, the usage data can indicate those operations that were most frequently performed by application users. The usage data can indicate a sequence or order in which the operations were performed by the application users. The usage data can indicate the actual inputs provided by the one or more users while they were using the application. The usage data can indicate a frequency of inputs provided. The usage data can indicate a sequence or order in which the inputs were provided by the application users.

In some cases, the application data includes data provided by a user of a client device. For example, with respect to FIG. 1, this application data can include data provided by a user of the client device 105, such as one or more operations to be included in the workflow 114 and/or the workflow 116, one or more workflows that are to be tested with the application, or the like.

The process 500 includes communicating with the client device (504). The client device can include a computing device, such as a desktop computer, a laptop computer, a smartphone, a tablet, or the like. The client device can be accessed by an administrator. Communication with the client device can take place over a network such as the internet. For example, with respect to FIG. 1, communicating with the client device can include the server 110 communicating with the client device 105 over the network 130.

As an example, communicating with the client device can include receiving information and/or data about the application to be tested. For example, with respect to FIG. 1, the server 110 can receive an indication of the version of the application that is to be tested, the settings for the devices 140a-140c that should be used during testing, the initial settings for the devices 140a-140c that should be used during testing, a new version of the application to be tested, an installer for a new version of the application to be tested, and/or usage data for the application.

Communicating with the client device can include receiving information about the test(s) to be conducted. For example, with respect to FIG. 1, the server 110 can receive an indication of the devices 140a-140c to be tested, one or more software versions or operating systems requirements for the devices 140a-140c to be tested, one or more hardware requirements for the devices 140a-140c to be tested, testing datasets, testing documents, one or more customized workflows, and/or one or more operations to be included in the workflow 114 and/or the workflow 116.

The process 500 includes producing one or more workflows based on the stored application data (506). The one or more workflows can each include multiple operations that are to be performed by the device(s) being tested while running the application. The stored application data can include, for example, usage data of the application. This usage data can include usage data for previously released versions of the application.

Producing one or more workflows based on the stored application data can include producing one or more workflows having operations indicated by the stored application data. The operations can be those operations that are always performed by users using the application, that are always performed together by users using the application, that are frequently performed by users using the application, that are frequently performed together by users using the application, that are sometimes performed by users using the application, that are sometimes performed together by users using the application, that are rarely performed by users using the application, that are rarely performed together by users using the application, that are never performed by users using the application, and/or that are never performed together by users using the application.

It can be helpful to generate workflows for those operations that are always or frequently performed and/or that are always or frequently performed together as these are likely to be the operations or groupings of operations that will be encountered when the application (e.g., the tested version of the application) is released, and it will be particularly important to ensure that the application is able to perform these operations or groupings of operations without error, with adequate performance, or the like. It can be helpful to generate workflows for those operations that are rarely or never performed and/or that are rarely or never performed together as these operations or groupings of operations can be helpful to identify errors or performance issues that might not otherwise be identified.

As an example, the usage data can indicate that five operations are frequently performed (e.g., performed 75% of the time or greater in a given session) and are usually performed in a specific order. These five operations can be used to create workflow. The five operations can be arranged in the workflow in the frequently used order as indicated by the usage data.

In some cases, producing one or more workflows based on the stored application data includes producing one or more workflows that include an operation specified by a user of the client device and an operation indicated by the stored application data. For example, with respect to FIG. 1, a user of the client device 105 can provide the server 110 instructions to include the "Zoom in on map" operation in the workflow 114. The other operations of the workflow 114 can be those operations that are found in the application usage data.

The process 500 includes receiving performance measurements (508). The performance measurements can be received over a network such as the internet. These performance measurements can include, for example, one or more response times, one or more task completion times, the number and/or severity of errors occurring, a stability of the application, and/or an accuracy of results produced. The performance measurements can be used to, for example, determine different devices and/or different types of devices that perform similarly. A type of device can include devices of the same model, same operating system, same operating system version, same processor, and/or same memory (e.g., RAM).

In some cases, the process 500 optionally includes determining that the different devices and/or the different types of devices perform similarly. As an example, the system, e.g., the server 110 shown in FIG. 1, can determine that the different devices and/or the different types of devices perform similarly by comparing the corresponding performance measurements, such as the response times, the task completion times, the error occurrences, the stabilities, and/or the accuracy of results between the different devices and/or the different types of devices. Determining that the different devices and/or the different types of devices perform similarly can include determining that one or more of the performance measures of a device or a type of device are within a threshold percentage (e.g., 2%, 5%, 10%, or the like) of the one or more performance measures of another device or another type of device, and/or that one or more of the performance measures of a device or a type of device correlate to the one or more performance measures of another device or another type of device within a threshold percentage (e.g., 2%, 5%, 10%, or the like). The correlation can be, for example, a linear relationship (e.g., with an offset), an inverse relationship, a quadratic relationship, or the like. Based on determining that the different devices and/or the different types of devices perform similarly, the system, e.g., the server 110, can estimate the performance measures for one or more devices and/or one or more types of devices without directly testing those one or more devices and/or one or more types of devices.

In some cases, determining that the different devices and/or the different types of devices perform similarly includes normalizing the performance measurements of one or more of the devices and/or one or more of the types of devices. For example, with respect to FIG. 2, the performance measurements obtained for Phone 2, Phone 3, Tablet 1, and Tablet 2 can be normalized based on Phone 1, e.g., based on the minimum cache size, the minimum allocated RAM, and/or the maximum active records of Phone 1.

As an example, with respect to FIG. 1, the performance measurements can be obtained by the server 120 and sent to the server 110.

As an example, with respect to FIG. 2, the performance measurements can include the performance measures 240 of the results data 210. The performance measures 240 can be used by the server 110 to identify those device types that perform similarly. For example, the server 110 can determine that Phone 3 and Tablet 2 perform similarly based on the response time and task completion time of Phone 3 being within a threshold percentage of the response time and task completion time of Tablet 2, and/or based on the response time and task completion time of Phone 3 having a linear relationship the response time and task completion time of Tablet 2. The linear relationship can be described in a formula as, for example, $P_{Phone3}d=P_{Tablet}+0.15$ that is accurate within a threshold error percentage.

The process 500 includes generating a document indicating performance of an application across a group of remote mobile devices (510). The document can include an indication of the performance measurements, the devices tested, and/or the configurations of the devices tested. A configuration of a device tested can include, for example, an operating system of the device, an operating system version of the device, a With respect to FIG. 1, the document can be the document(s) 160 generated by the server 110. With respect to FIG. 2, the document can be or include the results data 210. Accordingly, the document can include, for example, (i) a report document or code providing the user interface 230 for presenting result data, (ii) the device profiles 220 that specify the recommended settings to achieve the best performance and/or compatibility for different devices, and (iii) the performance measures 240 showing performance across the different devices and device configurations.

In some cases, generating a document indicating performance of the application across the group of remote mobile devices includes generating multiple documents. Each of the multiple documents can indicate the performance of the application on a remote mobile device of the group of remote mobile devices.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
    identifying a mobile device application to be tested;
    accessing usage data indicating previous usage of the mobile device application by multiple users;
    defining a workflow that includes a sequence of operations of the mobile device application, the sequence of operations being determined based on sequences of user inputs indicated by the usage data;

initiating installation of the application on each of a plurality of remote mobile devices, including mobile devices having different configurations;

for each of the remote mobile devices, testing performance of the application using different settings for the application, comprising:

simulating usage of the application with a first combination of application settings by providing input to the application running on the remote mobile devices that simulates user input causing the application to perform the sequence of operations for the workflow;

measuring performance of the remote mobile device while the first combination of application settings is used by the application;

changing one or more settings of the application on the remote mobile device such that a second combination of application settings is applied for the application; and after changing the one or more settings of the application, simulating usage of the application with the second combination of application settings by instructing the remote mobile device to perform a series of operations using the application and measuring performance of the remote mobile device while the second combination of application settings is used by the application;

based on the performance measurements for the remote mobile devices, determining a combination of settings or range of settings for the application for each of the different configurations of mobile devices; and generating a document that indicates the measured performance of the application across the different mobile device configurations and the determined combination of settings or range of settings for the application for the different configurations of mobile devices.

2. The method of claim 1, further comprising testing installation of the application on each of the plurality of remote mobile devices by logging errors that occur in installation processes executing on each of the remote mobile devices and measuring an amount of time that the respective installation processes require for each of the remote mobile devices.

3. The method of claim 1, wherein the plurality of remote mobile devices comprises mobile phones from different manufacturers and running different operating system versions.

4. The method of claim 1, wherein initiating installation comprises remotely initiating installation of the mobile device application on each of a plurality of remote mobile devices of different configurations that are operated by and made accessible by a third-party provider over a communication network.

5. The method of claim 1, wherein simulating usage of the application comprises causing the application to perform operations using documents and data sets served by a server system over a network;

wherein the method comprises:
configuring a particular cloud-based virtual server environment to serve the documents and data sets used in the simulated usage of the application; and
configuring the application installations on the remote mobile devices to communicate with the particular cloud-based virtual server environment.

6. The method of claim 1, wherein measuring performance of the respective mobile devices during the simulated usage comprises validating results generated by the respective mobile devices with respect to a set of reference results.

7. The method of claim 1, wherein measuring performance of the respective mobile devices during the simulated usage comprises measuring at east one of response time, error occurrence, task completion time, accuracy of results, or system stability.

8. The method of claim 1, further comprising:
changing server settings of a server environment in communication with the remote mobile devices to operate the server environment with different combinations of server settings during different periods of simulated usage of the application on the remote mobile devices; and
measuring performance of the application on the remote mobile devices for each of the different combinations of server settings used during the simulated usage of the application on the remote mobile devices.

9. The method of claim 1, wherein changing the one or more settings comprises changing at least one of a size of a data cache the mobile device, a working data amount for tasks of the application on the mobile device, an amount of memory allocated to the application or to a portion of the application on the mobile device, or a level of concurrency of tasks performed on the mobile device.

10. The method of claim 8, wherein changing the server settings comprises changing at least one of a size of a cache for the server environment, a working data amount for tasks performed in the server environment, an amount of memory allocated for the server environment, an amount of processors allocated for the server environment, or a software version of software used in the server environment.

11. The method of claim 1, further comprising determining, based on the performance measures for the different configurations, different limits on settings of the application that are needed for different configurations to achieve one or more performance criteria;

wherein determining the combination of settings or range of settings for the application for each of the different configurations of mobile devices comprises determining, for each particular mobile device configuration of multiple mobile device configurations, a device profile that specifies one or more limits for settings of the application when used on mobile devices having the particular mobile device configuration.

12. The method of claim 1, further comprising determining, based on the measured performance, relative performance measures indicating relationships between performance characteristics of devices of different configurations; and determining performance estimates for devices of configurations that are not tested based on the relative performance measures.

13. The method of claim 1, wherein the different configurations of the remote mobile devices comprise different hardware configurations; and wherein determining the combination of settings or range of settings for the application for each of the different configurations of mobile devices comprises determining a different profile for each of the different hardware configurations; the profiles indicating different sets of settings to be used for the different hardware configurations.

14. The method of cairn 1, wherein the different configurations of the remote mobile devices comprise different operating systems or different operating system versions; and wherein determining the combination of settings or range of settings for the application for each of the different configurations of mobile devices comprises determining a different profile for each of the different operating systems or operating system versions, the profiles indicating different sets of settings to be used for the different operating systems or operating system versions.

15. The method of claim 1, wherein changing the one or more settings comprises repeatedly changing a setting of the remote mobile devices and simulating usage of the application with the changed setting until reaching a value of the setting that results in an error, a failure; or a predetermined performance limit during simulated usage of the application.

16. A system comprising:
one or more computers; and
one or more computer-readable media storing instructions that are operable, when executed by the one or more computers, to cause the one or more computers to perform operations comprising:
identifying a mobile device application to be tested;
accessing usage data indicating previous usage of the mobile device application by multiple users;
defining a workflow that includes a sequence of operations of the mobile device application, the sequence of operations being determined based on sequences of user inputs indicated by the usage data;
initiating installation of the application on each of a plurality of remote mobile devices, including mobile devices having different configurations;
for each of the remote mobile devices, testing performance of the application using different settings for the application, comprising:
simulating usage of the application with a first combination of application settings by providing input to the application running on the remote mobile devices that simulates user input causing the application to perform the sequence of operations for the workflow;
measuring performance of the remote mobile device while the first combination of application settings is used by the application;
changing one or more settings of the application on the remote mobile device such that a second combination of application settings is applied for the application; and
after changing the one or more settings of the application, simulating usage of the application with the second combination of application settings by instructing the remote mobile device to perform a series of operations using the application and measuring performance of the remote mobile device while the second combination of application settings is used by the application;
based on the performance measurements for the remote mobile devices, determining a combination of settings or range of settings for the application for each of the different configurations of mobile devices; and
generating a document that indicates the measured performance of the application across the different mobile device configurations and the determined combination of settings or range of settings for the application for the different configurations of mobile devices.

17. One or more non-transitory computer-readable media storing instructions that, when executed by one or more processing devices, cause the one or more processing devices to perform operations comprising:
identifying a mobile device application to be tested;
accessing usage data indicating previous usage of the mobile device application by multiple users;
defining a workflow that includes a sequence of operations of the mobile device application, the sequence of operations being determined based on sequences of user inputs indicated by the usage data;
initiating installation of the application on each of a plurality of remote mobile devices, including mobile devices having different configurations;
for each of the remote mobile devices, testing performance of the application using different settings for the application, comprising:
simulating usage of the application with a first combination of application settings by providing input to the application running on the remote mobile devices that simulates user input causing the application to perform the sequence of operations for the workflow;
measuring performance of the remote mobile device while the first combination of application settings is used by the application;
changing one or more settings of the application on the remote mobile device such that a second combination of application settings is applied for the application; and
after changing the one or more settings of the application, simulating usage of the application with the second combination of application settings by instructing the remote mobile device to perform a series of operations using the application and measuring performance of the remote mobile device while the second combination of application settings is used by the application; and
based on the performance measurements for the remote mobile devices, determining a combination of settings or range of settings for the application for each of the different configurations of mobile devices; and
generating a document that indicates the measured performance of the application across the different mobile device configurations and the determined combination of settings or range of settings for the application for the different configurations of mobile devices.

* * * * *

UNITED STATES PATENT AND TRADEMARK OFFICE
CERTIFICATE OF CORRECTION

PATENT NO. : 11,409,644 B2
APPLICATION NO. : 16/815788
DATED : August 9, 2022
INVENTOR(S) : Herminio Carames et al.

It is certified that error appears in the above-identified patent and that said Letters Patent is hereby corrected as shown below:

In the Claims

In Claim 7, Column 34, Line 3, delete "east" and insert -- least --.

In Claim 13, Column 34, Line 58, delete "configurations;" and insert -- configurations, --.

In Claim 14, Column 34, Line 61, delete "cairn" and insert -- claim --.

In Claim 15, Column 35, Line 8, delete "failure;" and insert -- failure, --.

Signed and Sealed this
Fourteenth Day of February, 2023

Katherine Kelly Vidal
*Director of the United States Patent and Trademark Office*